US012518370B2

(12) United States Patent
He

(10) Patent No.: US 12,518,370 B2
(45) Date of Patent: Jan. 6, 2026

(54) IMAGE INSPECTION APPARATUS AND IMAGE INSPECTION METHOD

(71) Applicant: Keyence Corporation, Osaka (JP)

(72) Inventor: Di He, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 450 days.

(21) Appl. No.: 17/686,474

(22) Filed: Mar. 4, 2022

(65) Prior Publication Data
US 2022/0335588 A1    Oct. 20, 2022

(30) Foreign Application Priority Data

Apr. 16, 2021   (JP) ................................ 2021-069449

(51) Int. Cl.
*G06T 7/00* (2017.01)
*G06N 3/045* (2023.01)
(Continued)

(52) U.S. Cl.
CPC ............. *G06T 7/001* (2013.01); *G06N 3/045* (2023.01); *G06N 3/08* (2013.01); *G06V 10/764* (2022.01);
(Continued)

(58) Field of Classification Search
CPC ........... G06T 7/001; G06T 2207/20081; G06T 2207/20084; G06T 2207/20092;
(Continued)

(56) References Cited

U.S. PATENT DOCUMENTS 7,602,962 B2 * 10/2009 Miyamoto .............. G06F 18/40
382/149
8,878,977 B2    11/2014 Sagisaka et al.
(Continued)

FOREIGN PATENT DOCUMENTS

JP        2020187070 A      11/2020

OTHER PUBLICATIONS

Chen et al., "Workpiece Detection Based on Image Processing and Convolutional Neural Network," 2020 International Conference on Sensing, Measurement & Data Analytics in the era of Artificial Intelligence (ICSMD), Xi'an, China, 2020, pp. 302-306, doi: 10.1109/ICSMD50554.2020.9261649. (Year: 2020).*

(Continued)

*Primary Examiner* — Emily C Terrell
*Assistant Examiner* — Julia Z. Yao
(74) *Attorney, Agent, or Firm* — Kilyk & Bowersox, P.L.L.C.

(57)  ABSTRACT

An image inspection apparatus includes a learned neural network storage storing a neural network that previously learns weighting factors between input, intermediate and output layers, and an inferer determining failure/no-failure of a workpiece and classify the workpiece to classes based on an image of the workpiece. The inferer performs first and second inferences. In the first inference, the inferer determines failure/no-failure of the workpiece based on failure/no-failure feature quantities that are obtained by providing the workpiece image to the neural network and a failure/no-failure determination boundary. In the second inference, the inferer define a classification boundary to be used to classify an inspection workpiece to the classes in a feature quantity space of the neural network based on classification feature quantities that represent the different-type classification workpiece images, and classifies a workpiece to the (Continued)

classes based on classification feature quantities of an image of the workpiece and the classification boundary.

8 Claims, 15 Drawing Sheets

(51) Int. Cl.
*G06N 3/08* (2023.01)
*G06V 10/70* (2022.01)
*G06V 10/764* (2022.01)
*G06V 10/82* (2022.01)
*G06V 10/94* (2022.01)

(52) U.S. Cl.
CPC .............. *G06V 10/82* (2022.01); *G06V 10/87* (2022.01); *G06V 10/945* (2022.01); *G06T 2207/20081* (2013.01); *G06T 2207/20084* (2013.01); *G06T 2207/20092* (2013.01); *G06T 2207/30164* (2013.01)

(58) Field of Classification Search
CPC ......... G06T 2207/30164; G06T 7/0004; G06T 7/0008; G06N 3/045; G06N 3/08; G06N 3/09; G06N 3/04; G06V 10/764; G06V 10/82; G06V 10/87; G06V 10/945; G01N 21/8806; G01N 21/8851
See application file for complete search history.

(56) References Cited

U.S. PATENT DOCUMENTS

| | | | |
|---|---|---|---|
| 9,182,356 B2 | 11/2015 | Nagoshi | |
| 9,336,586 B2 | 5/2016 | Nagoshi | |
| 10,194,095 B2 | 1/2019 | Fujiwara | |
| 10,885,626 B2 * | 1/2021 | Tamai | G06V 20/00 |
| 11,042,976 B2 | 6/2021 | He | |
| 11,042,977 B2 | 6/2021 | Kurihara et al. | |
| 11,087,456 B2 | 8/2021 | Hino et al. | |
| 2002/0051565 A1 * | 5/2002 | Hiroi | G06T 7/001 |
| | | | 382/149 |
| 2004/0252878 A1 * | 12/2004 | Okuda | G06F 18/2415 |
| | | | 382/226 |
| 2013/0128027 A1 | 5/2013 | Katsurada et al. | |
| 2013/0202189 A1 * | 8/2013 | Shibuya | G06V 10/7788 |
| | | | 382/149 |
| 2015/0254832 A1 * | 9/2015 | Plihal | G06N 20/00 |
| | | | 382/149 |
| 2017/0069075 A1 * | 3/2017 | Okuda | G06V 10/764 |
| 2018/0259947 A1 * | 9/2018 | Mioki | G05B 19/4189 |
| 2019/0188846 A1 | 6/2019 | Tamai | G06V 10/82 |
| 2019/0287235 A1 * | 9/2019 | Ikeda | G06T 7/62 |
| 2021/0110215 A1 * | 4/2021 | Okamoto | G06V 10/771 |
| 2021/0342239 A1 * | 11/2021 | Gladisch | G06F 11/2257 |
| 2023/0143738 A1 * | 5/2023 | Kim | G06T 11/60 |
| | | | 382/141 |
| 2023/0169642 A1 * | 6/2023 | Floeder | G06T 7/001 |
| | | | 382/103 |
| 2024/0070847 A1 * | 2/2024 | Mochizuki | G06T 7/001 |
| 2024/0385121 A1 * | 11/2024 | Bakhshmand | G06V 10/26 |

OTHER PUBLICATIONS

U.S. Appl. No. 17/686,468, filed Mar. 4, 2022 (55 pages).

* cited by examiner

IMAGE INSPECTION APPARATUS AND IMAGE INSPECTION METHOD

CROSS-REFERENCE TO RELATED APPLICATIONS

The present application claims foreign priority based on Japanese Patent Application No. 2021-069449, filed Apr. 16, 2021, the contents of which are incorporated herein by reference.

BACKGROUND

1. Technical Field

The present disclosure relates to an image inspection apparatus, an image inspection method, an image inspection program, and a computer-readable storage medium or storage device storing the image inspection program.

2. Description of Related Art

An image sensor with built-in AI that determines failure/no-failure of a workpiece has recently come on the market. Such an AI image sensor has a learning-based inspection mode, which learns images depending on users' environments in use.

However, a long time and a large amount of teaching data are required to establish a neural network that realizes the learning-based inspection mode. Because much time and effort are required, it cannot be said that the aforementioned AI image sensor has good usability. A neural network is necessarily changed to another neural network if a user wants to use different inferences. For example, in the case in which the AI image sensor is used to perform inspection in one production line and then in a different production line, the AI image sensor necessarily newly learns images in the different production line, and as a result much time and effort are required (see e.g., Japanese Patent Laid-Open Publication No. JP 2020-187,070 A).

It is one object of the present disclosure to provide an image inspection apparatus, an image inspection method and an image inspection program that can easily create learning data, and a computer-readable storage medium or storage device storing the image inspection program.

SUMMARY

An image inspection apparatus according to an aspect of the present disclosure includes an illuminator, a camera, a learned neural network storage, and an inferer. The illuminator irradiates a workpiece as an inspection object with illumination light. The camera receives light that is reflected from the workpiece, which is irradiated by the illuminator, and produces a workpiece image. The learned neural network storage stores one neural network or a plurality of neural networks that includes input, intermediate and output layers. The workpiece image is provided to the input layer. The intermediate layer is connected to the input layer. The output layer is connected to the intermediate layer and provides feature quantities of the workpiece image. The one neural network or plurality of neural networks previously learn weighting factors between the input, intermediate and output layers. The inferer can determine failure/no-failure of the workpiece and classify the workpiece to classes based on the workpiece image. Failure and no-failure product workpiece images that represent failure and no-failure workpieces respectively are captured by the camera. A workpiece image of the inspection workpiece is captured by the camera. Different types of workpiece images are captured by the camera. A workpiece image of the inspection workpiece is captured by the camera. The inferer is configured to specify a failure/no-failure determination boundary to be used to determine failure/no-failure of the workpiece in a feature quantity space(s) of the neural network(s) based on failure feature quantities and no-failure feature quantities of the failure and no-failure product workpiece images that are obtained by providing the failure and no-failure product workpiece images to the neural network(s), which is/are stored in the learned neural network storage, and determine failure/no-failure of an inspection workpiece based on failure/no-failure feature quantities of a workpiece image of the inspection workpiece that are obtained by providing the inspection workpiece image to the neural network(s) and the failure/no-failure determination boundary in a first inference. Also the inferer is configured to specify a classification boundary to be used to classify an inspection workpiece to classes corresponding to different types of workpieces in a feature quantity space(s) of the neural network(s) based on a plurality of classification feature quantities of different types of workpiece images that are obtained by providing the different types of workpieces images to the neural network(s), which is/are stored in the learned neural network storage, and classify an inspection workpiece to classes based on classification feature quantities of a workpiece image of the inspection workpiece that is obtained by providing the inspection workpiece image to the neural network(s) and the classification boundary in a second inference. This image inspection apparatus previously prepares one or a plurality of learned neural networks that are commonly used to perform both failure/no-failure determination and classification. As a result, time and effort can be eliminated to establish neural networks that are used to perform their dedicated inferences. Therefore, a simple environment for both failure/no-failure determination and classification can be created.

An image inspection method according to another aspect of the present is a method that inspects a workpiece as an inspection object to determine failure/no-failure of a workpiece or classify the workpiece to classes based on a workpiece image. The workpiece is irradiated with illumination light by an illuminator so that a camera receives light that is reflected from the workpiece to produce the workpiece image. The method includes preparation of one or a plurality of learned neural networks, storage of the one neural network or plurality of neural networks, image capture of a no-failure workpiece, image capture of a failure workpiece, specification of a failure/no-failure determination boundary, image capture of different types of workpiece images, specification of a classification boundary, image capture of an inspection workpiece, obtainment of failure/no-failure feature quantities, determination of failure/no-failure, obtainment of classification feature quantities, classification of the inspection workpiece. The one or a plurality of learned neural networks is prepared in the preparation of one or a plurality of learned neural networks. The one learned neural network or plurality of learned neural networks include input, intermediate, and output layers. The input layer receives the workpiece image. The intermediate layer is connected to the input layer. The output layer is connected to the intermediate layer and provides feature quantities of the workpiece image. The one neural network or plurality of neural networks previously learn weighting factors between the input, intermediate and output layers.

The one neural network or plurality of neural networks are stored in a learned neural network storage in the storage of the one neural network or plurality of neural networks. An image of the no-failure workpiece is captured to produce a no-failure product image by using the camera in the image capture of a no-failure workpiece. An image of the failure workpiece is captured to produce a failure product image by using the camera in the image capture of a failure workpiece. The failure/no-failure determination boundary to be used to determine failure/no-failure of the workpiece in a feature quantity space(s) of the neural network(s) is specified based on failure feature quantities and no-failure feature quantities that are obtained by providing the failure and no-failure product workpiece images to the neural network(s), which is/are stored in the learned neural network storage, to obtain failure feature quantities and no-failure feature quantities, which represent failure and no-failure workpieces, respectively, of the failure and no-failure product workpiece images in the specification of a failure/no-failure determination boundary. Images of the different types of workpiece images are captured to produce different-type classification workpiece images corresponding to different types of workpieces by using the camera in the image capture of different types of workpiece images. The classification boundary to be used to classify an inspection workpiece to classes corresponding to different types of workpieces in a feature quantity space(s) of the neural network(s) is specified based on a plurality of classification feature quantities of the different-type classification workpiece images that are obtained by providing the different-type classification workpiece images to the neural network(s), which is/are stored in the learned neural network storage in the specification of a classification boundary. An image of the inspection workpiece is captured to produce an inspection workpiece image by using the camera in the image capture of an inspection workpiece. The failure/no-failure feature quantities of the inspection workpiece image are obtained by providing the inspection workpiece image to the neural network(s), which is/are stored in the learned neural network storage, in the obtainment of failure/no-failure feature quantities. Failure/no-failure of the inspection workpiece is determined based on the failure/no-failure feature quantities obtained of the inspection workpiece image and the failure/no-failure determination boundary in a first inference in the determination of failure/no-failure. The classification feature quantities of the inspection workpiece image are obtained by providing the inspection workpiece image to the neural network(s), which is/are stored in the learned neural network storage in the obtainment of classification feature quantities. The inspection workpiece is classified to the classes based on the classification feature quantity obtained of the inspection workpiece image and the classification boundary in a second inference in the classification of the inspection workpiece. This image inspection method previously prepares one learned neural network or a plurality of learned neural networks that are commonly used to perform both failure/no-failure determination and classification. As a result, time and effort can be eliminated to establish neural networks that are used to perform their dedicated inferences. Therefore, a simple environment for both failure/no-failure determination and classification can be created.

An image inspection method according to another aspect of the present is a method that inspects a workpiece as an inspection object to determine failure/no-failure of a workpiece or classify the workpiece to classes based on a workpiece image. The workpiece is irradiated with illumination light by an illuminator so that a camera receives light that is reflected from the workpiece to produce the workpiece image. The method includes preparation of one learned neural network or a plurality of learned neural networks, storage of the one neural network or plurality of neural networks, provision of failure and no-failure product images, provision of different-type classification workpiece images, creation of failure/no-failure determination and classification criteria, provision of an inspection workpiece image, and determination of failure/no-failure. The one learned neural network or plurality of learned neural networks is prepared in the preparation of one learned neural network or plurality of learned neural networks. The one learned neural network or plurality of learned neural networks include input, intermediate, and output layers. The input layer receives the workpiece image. The intermediate layer is connected to the input layer. The output layer is connected to the intermediate layer and provides feature quantities of the workpiece image. The one neural network or plurality of neural networks previously learn weighting factors between the input, intermediate and output layers. The one neural network or plurality of neural networks are stored in a learned neural network storage in the storage of the one neural network or plurality of neural networks. The failure and no-failure product images that are produced by capturing images of failure and no-failure workpiece, respectively, by using the camera are provided to the neural network(s), which is/are stored in the learned neural network storage, in the provision of failure and no-failure product images. The different-type classification workpiece images corresponding to different types of workpieces produced by capturing images of different types of workpiece by using the camera are provided to the neural network(s), which is/are stored in the learned neural network storage, in the provision of different-type classification workpiece images. The failure/no-failure determination criteria to be used to determine failure/no-failure of an inspection workpiece in a feature quantity space(s) of the neural network(s) are created based on a plurality of failure feature quantities and a plurality of no-failure feature quantities that represent failure and no-failure product images, respectively, and the classification criteria to be used to classify an inspection workpiece to the classes in a feature quantity space(s) of the neural network(s) are created based on a plurality of classification feature quantities that represent the different-type classification workpiece images in the creation of failure/no-failure determination and classification criteria. The inspection workpiece image that is produced by capturing an image of an inspection workpiece by using the camera is provided to the neural network(s), which is/are stored in the learned neural network storage, in the provision of an inspection workpiece image. Failure/no-failure of the inspection workpiece is determined based on inspection feature quantities that represent the inspection workpiece image and the failure/no-failure determination criteria in a first inference, and, if no-failure of the inspection workpiece is determined, the inspection workpiece is classified to the classes based on feature quantity that represent the inspection workpiece image and classification criteria and a classification result is provided in a second inference in the determination of failure/no-failure. This image inspection method previously prepares one learned neural network or a plurality of learned neural networks that are commonly used to perform both failure/no-failure determination and classification. As a result, time and effort can be eliminated to establish neural networks that are used to perform their dedicated inferences. Therefore, a simple environment for both failure/no-failure determination and classification can be created.

An image inspection program according to another aspect of the present is a program which executes a computer to perform an image inspection in an image inspection apparatus including an illuminator, a camera, a learned neural network storage, and an inferer. The illuminator irradiates a workpiece as an inspection object with illumination light. The camera receives light that is reflected from the workpiece, which is irradiated by the illuminator, and produces a workpiece image. The learned neural network storage stores one neural network or a plurality of neural networks that includes input, intermediate and output layers. The workpiece image is provided to the input layer. The intermediate layer is connected to the input layer. The output layer is connected to the intermediate layer and provides feature quantities of the workpiece image. The one neural network or plurality of neural networks previously learn weighting factors between the input, intermediate and output layers. The inferer can determine failure/no-failure of the workpiece and classify the workpiece to classes based on the workpiece image. The program includes preparation of one learned neural network or a plurality of learned neural networks, storage of the one neural network or plurality of neural networks, provision of failure and no-failure product images, provision of different-type classification workpiece images, creation of failure/no-failure determination and classification criteria, provision of an inspection workpiece image, and determination of failure/no-failure. The one learned neural network or plurality of learned neural networks is prepared in the preparation of one learned neural network or a plurality of learned neural networks. The one learned neural network or plurality of learned neural networks include input, intermediate, and output layers. The input layer receives the workpiece image. The intermediate layer is connected to the input layer. The output layer is connected to the intermediate layer and provides feature quantities of the workpiece image. The one neural network or plurality of neural networks previously learn weighting factors between the input, intermediate and output layers. The one neural network or plurality of neural networks are stored in a learned neural network storage in the storage of the one neural network or plurality of neural networks. The failure and no-failure product images that are produced by capturing images of failure and no-failure workpiece, respectively, by using the camera are provided to the neural network(s), which is/are stored in the learned neural network storage, in the provision of failure and no-failure product images. The different-type classification workpiece images corresponding to different types of workpieces produced by capturing images of different types of workpiece by using the camera are provided to the neural network(s), which is/are stored in the learned neural network storage, in the provision of different-type classification workpiece images. The failure/no-failure determination criteria to be used to determine failure/no-failure of an inspection workpiece in a feature quantity space(s) of the neural network(s) are created based on a plurality of failure feature quantities and a plurality of no-failure feature quantities that represent failure and no-failure product images, respectively, and the classification criteria to be used to classify an inspection workpiece to the classes in a feature quantity space(s) of the neural network(s) are created based on a plurality of classification feature quantities that represent the different-type classification workpiece images in the creation of failure/no-failure determination and classification criteria. The inspection workpiece image that is produced by capturing an image of an inspection workpiece by using the camera is provided to the neural network(s), which is/are stored in the learned neural network storage, in the provision of an inspection workpiece image. Failure/no-failure of the inspection workpiece is determined based on an inspection feature quantities that represent the inspection workpiece image and the failure/no-failure determination criteria in a first inference, and, if no-failure of the inspection workpiece is determined, the inspection workpiece is classified to the classes based on inspection feature quantity that represent the inspection workpiece image and classification criteria and a classification result is provided in a second inference in the determination of failure/no-failure. This image inspection program previously prepares one learned neural network or a plurality of learned neural networks that are commonly used to perform both failure/no-failure determination and classification. As a result, time and effort can be eliminated to establish neural networks that are used to perform their dedicated inferences. Therefore, a simple environment for both failure/no-failure determination and classification can be created.

A computer-readable storage medium or storage device according to a still another aspect of the present disclosure includes the aforementioned program. The storage medium can be a magnetic disk, optical disc, magneto-optical disk or semiconductor memory such as CD-ROM, CD-R, CD-RW, flexible disk, magnetic tape, MO, DVD-ROM, DVD-RAM, DVD-R, DVD+R, DVD-RW, DVD+RW, Blu-ray, HD DVD (AOD), UHD (trade names), or another medium that can store the program. The program can be distributed in a form stored in the storage medium, and be also distributed through network such as the Internet (downloaded). The storage device can include a general-purpose device or special-purpose device on which the aforementioned program is installed in a form of executable software, firmware or the like. Processes or functions included in the program can be executed by the program software that can be executed by a computer. The processes of parts can be realized by hardware such as certain gate array (FPGA, ASIC), or a form of combination of program software and partial hardware module that realizes parts of elements of hardware.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION

Figure 1:
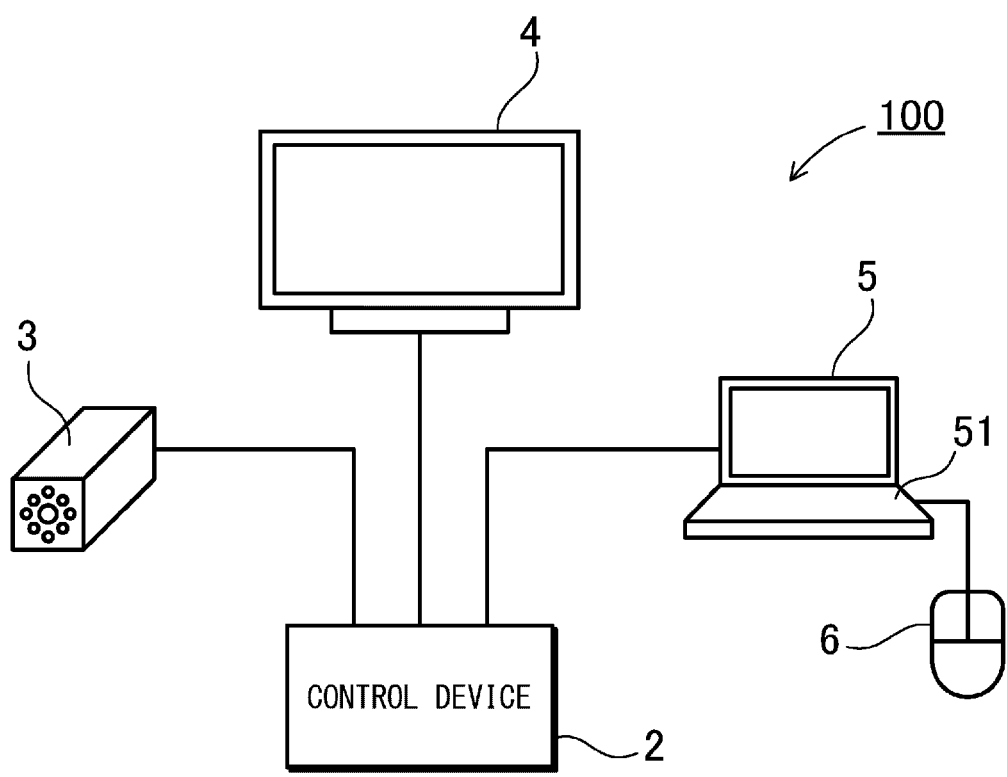
FIG. 1 is a schematic view showing devices of an image inspection apparatus according to an embodiment of the present disclosure.

The following description will describe embodiments according to the present disclosure with reference to the drawings. It should be appreciated, however, that the embodiments described below are illustrations of an image inspection apparatus, an image inspection method, an image inspection program, and a computer-readable storage medium or storage device storing the image inspection program to give an image inspection apparatus, an image inspection method, an image inspection program, and a computer-readable storage medium or storage device storing the image inspection program of the present disclosure are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this present disclosure are attached with the same designation and the same reference signs, and their description is omitted. In addition, a plurality of structural elements of the present disclosure can be configured as a single part that serves the purpose of a plurality of elements, on the other hand, a single structural element can be configured as a plurality of parts that serve the purpose of a single element.

First Embodiment

An image inspection apparatus 100 according to a first embodiment of the present disclosure is now described with reference to a schematic view of FIG. 1. The image inspection apparatus 100 can be used to determine failure/no-failure or classification of an object to be inspected (inspection object, occasionally referred to as workpiece) such as various types of industrial parts or products based on an image of the inspection object that is captured by the apparatus, for example. Such an image inspection apparatus is also referred to as an image sensor, etc., and can be used in a manufacturing location such as a factory. Inspection is performed on the entire of or a part of the inspection object. The inspection object can include a plurality of parts to be inspected. Also, one image can include a plurality of inspection objects.

In this embodiment, the image inspection apparatus 100 is illustratively described as an image inspection apparatus that captures an image of an external appearance of an inspection object, and determine failure/no-failure or classification of the inspection object based on the image captured with reference to predetermined inspection standards. Failure/no-failure determination standards that require a no-failure product are previously specified as the predetermined standards, for example. The image inspection apparatus can capture an image of an inspection object, and determine failure/no-failure of the inspection object based on the image captured with reference to the failure/no-failure determination standards when used or operating in the failure/no-failure determination. In the classification, an inspection object that has been determined as a no-failure product is determined which type the inspection object belongs to or is classified to classes in accordance with classification conditions that are previously specified. For example, one of the classification conditions can be a color condition of red, blue or green. An inspection object will be correspondingly determined red, blue or green, or classified to red, blue and green classes.

The image inspection apparatus 100 includes a main unit as a control device 2, an imaging device 3, a display 4, a personal computer 5, and a pointing device as an operator device 6. An image inspection program that operates the image inspection apparatus 100 is installed on the personal computer 5. User interface screens of the image inspection program can be displayed on a monitor of the personal computer 5 or the display 4. The personal computer 5 is not necessarily included but can be omitted. If the personal computer 5 is omitted, the control device 2 performs image inspection. Alternatively, the image inspection program can be executed in the control device 2.

The monitor or display screen of the personal computer can be used instead of the display 4. Although the control device 2, the imaging device 3, the display 4, the personal computer 5, and the operator device 6 are separately provided in as exemplary devices, which compose the image inspection apparatus 100 shown in FIG. 1, any two or more of the devices can be integrally formed as a single unit. For example, the control device 2 and the imaging device 3, or the control device 2 and the display 4 can be integrally formed as a single unit. Also, the control device 2 can be divided into two or more units, and some of the two or more units can be integrally formed with the imaging device 3 or the display 4. On the other hand, the imaging device 3 can be divided into two or more units, and some of the two or more units can be integrally formed with other device. Although the operator device 6 is illustratively separately provided in FIG. 1, the operator device can be integrally formed with other device by using an input device that is included in the personal computer or by using a touch panel as the display, for example.

The control device 2 is connected to the imaging device 3, the display 4, and the personal computer 5 through cables in the embodiment apparatus shown in FIG. 1. Connection between the devices in the present disclosure is not limited to wired connection but can be wireless connection that uses radio waves, infrared rays, visible light, or the like including wireless LAN, public radio communications services, NFC, and the like. Suitable standard communication protocols or interfaces such as Ethernet, IEEE802.1x and USB, Bluetooth, and ZigBee, which are a registered trademark or trade name, or a suitable dedicated communication protocol or interfaces can be used as communication standards for the image inspection apparatus.

Figure 2:
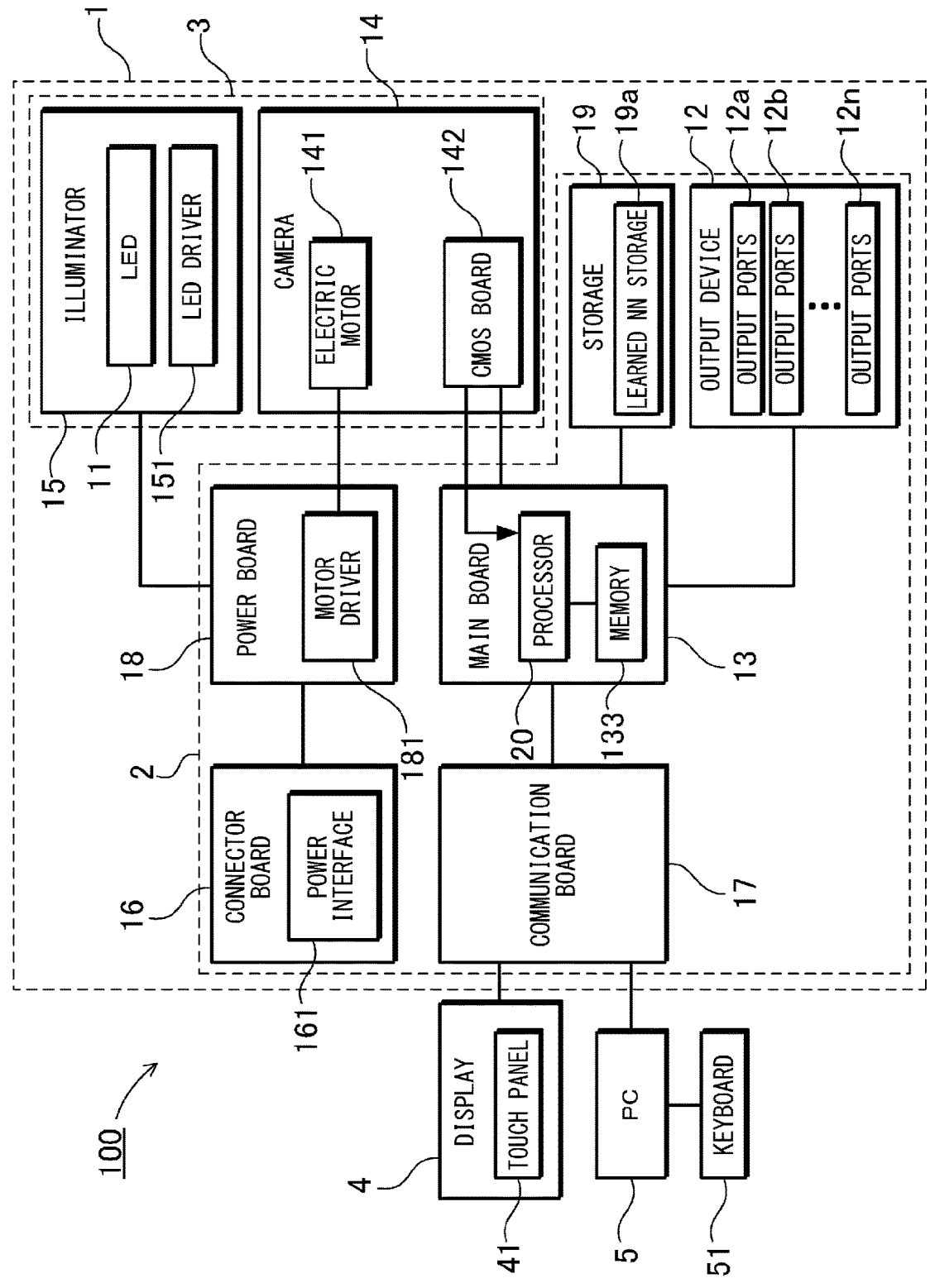
FIG. 2 is a block diagram showing device hardware components of the image inspection apparatus.

FIG. 2 is a block diagram showing device hardware components of the image inspection apparatus 100 according to the first embodiment of the present disclosure. This illustrated image inspection apparatus 100 includes a housing 1, which includes the control device 2 and the imaging device 3, the display 4, and the personal computer 5.

The housing 1 is a box, which forms an exterior shape of the image inspection apparatus 100, and accommodates an illuminator 15, a camera 14 and a learned neural network storage 19a, an inferer 20a, and the like. The housing 1 includes an interface that receives users' specification. The interface allows users to select a failure/no-failure determination mode to determine failure/no-failure of a workpiece or a classification mode to classify a workpiece. The inferer 20a performs a first or second inference in accordance with the mode that is selected through the interface. Because the image inspection apparatus does not use a learned neural network that is stored in a physically remote place such as cloud service but includes the learned neural network storage 19a, which is prepared and stores learned neural network data in the image inspection apparatus, this image inspection apparatus can perform inference even without data communication devices. Consequently, the inference performed by this image inspection apparatus can be insusceptible to data delay, disturbances, and the like.

(Control Device 2)

The control device 2 includes a main board 13, a connector board 16, a communication board 17, a power supply board 18, a storage 19, and an output device 12. The main board 13 includes a processor 20 and a memory 133. The memory 133 is constructed of a RAM, ROM, or the like.

The connector board 16 is supplied with electric power from an external power supply through a power connector that is includes in a power supply interface 161. The power supply board 18 can supply the electric power supplied to the aforementioned boards. The camera 14 is supplied with electric power through the main board 13 in this embodiment. The power supply board 18 includes an electric motor driver 181, which can supply electric power to drive an electric motor 141 of the camera 14 so that auto-focusing is performed.

The communication board 17 can transmit an OK/NG signal (determination signal) representing a failure/no-failure result of an inspection object that is provided from the main board 13, an image data, and the like to the display 4. The display 4 can display the determination result when receiving the determination signal. Although the determination signal has been illustratively described to be provided through the communication board 17 in this embodiment, the determination signal can be provided through the connector board 16, for example.

(Operator Device 6)

The image inspection apparatus 100 includes the operator device 6, which can receive users' manipulations. Existing input devices such as a keyboard, a mouse, and a touch panel can be used as the operator device 6. The communication board 17 can receive users' various manipulations that are provided from a touch panel 41, which is included in the display 4, and a keyboard 51, which is connected to the personal computer 5, and the like in the embodiment shown in FIG. 2. The touch panel 41 of the display 4 is a known touch type console panel that includes a pressure sensor, which can detect user's touch on the panel, and can provide a touch detection signal to the communication board 17. The personal computer 5 includes a mouse or a touch panel in addition to the keyboard 51, can receive user's various manipulations that are provided from these input devices. Communication of users' manipulations can be wired or wireless communication. Both the wired and wireless communications can be realized by well-known communication modules.

The illuminator 15 includes a plurality of LEDs 11, which can irradiate an image capture area of an inspection object to be inspected with illumination light. The LEDs 11 can include a lens and a reflector. The lens can be changed between short and long range lenses. In this specification, although the illumination light mainly refers to light that is emitted by the illuminator 15, the illumination light can include environmental light, which comes not from such an illuminator 15 but from the outside, such as natural light.

The imaging device 3 includes the camera 14 and the illuminator 15. The camera 14 can automatically focus by driving the electric motor 141. The camera 14 can capture an image of an inspection object in response to imaging instruction signals from the main board 13. The imaging device in this embodiment includes a CMOS board 142. Color images captured can be converted to HDR images in accordance with dynamic range conversion characteristics of the camera by the CMOS board 142. The HDR images will be provided to the processor 20 of the main board 13.

The main board 13 controls operations of the boards that are connected to the main board 13. A control signal that controls ON/OFF and the like of the LEDs 11 can be transmitted to an LED driver 151, which is included in the illuminator 15, for example. The LED driver 151 controls ON/OFF and light amount adjustment of the LEDs 11 in response to the control signal from the processor 20. Also, a control signal that controls auto-focusing can be transmitted through the electric motor driver 181 of the power supply board 18 to the electric motor 141 of the camera 14. Also, an imaging instruction signal can be transmitted to the CMOS board 142.

(Processor 20)

The processor 20 of the main board 13 is a control circuit or controlling element that can manipulate or process signals or data that is provided to the processor 20 for various types of calculations, and provide calculation results. The processor 20 is not limited to a processors such as a general-purpose PC CPU, MPU, GPU or TPU, but can be a dedicated gate array (e.g., LSI, FPGA, or ASIC), a microcomputer, a chipset (e.g., SoC), a package, or the like. The processor 20 realizes a plurality of functions discussed later. The processor in the present disclosure is not limited to a physically single processor but can be constructed of a plurality of CPUs and the like. Such two or more CPUs include not only two or more physically separated CPUs but also a so-called MPU, which includes two or more CPU cores in a single package. In the case of such two or more CPUs, two or more physically separated CPUs or CPU cores can realize the plurality of functions. Alternatively, the plurality of functions can be assigned to two or more physically separated CPUs or CPU cores one by one. Also, the processor can be constructed of a CPU and a GPU. In this case, the GPU can realize functions of the aforementioned display controller, and some or all of functions that are assigned to the processor.

In the embodiment shown FIG. 2, the processor 20 of the main board 13 is constructed of an FPGA and a DSP. The FPGA controls illumination and image capturing, and processes digital images captured through an algorithm. The DSP applies edge detection and pattern searching algorithms, etc. to image data. The processor 20 can provide the communication board 17 with a determination result that representing a failure/no-failure result of an inspection object based on a result through the pattern searching algorithm. The memory 133 will store manipulated and calculated results, and the like. The FPGA has been illustratively described to perform the illumination and image capturing controls, and the like in this embodiment, the DSP can perform the illumination and image capturing controls, and the like. A single main control circuit or a main controlling element can be provided instead of a combination of the FPGA and the DSP. For example, a single CPU as the single main controlling element can function to transmit control signals that control ON/OFF of the LEDs 11 to the LED driver 151, control signals that control auto-focusing to the electric motor 141 of the camera 14, and imaging instruction signals, etc. to the CMOS board 142.

(Storage 19)

The control device 2 includes the storage 19 such as a hard disk drive. The storage 19 can store a program and a configuration file, and the like that execute various types of later-discussed control and processing (software) by using the aforementioned hardware components, master images, failure/no-failure determination results, and the like. The program file and the configuration file can be stored in a removable storage medium such as a USB memory or an optical disc, and the control device 2 can load the program file and configuration file, which are stored in the storage medium, for example.

The storage 19 serves as the learned neural network storage 19a, which stores one learned neural network or a plurality of learned neural networks. The learned neural network includes an input layer that receives a workpiece image, an intermediate layer that is connected to the input layer, and an output layer that is connected to the intermediate layer and provides feature quantities of the workpiece image received. Weighting factors between the layers are previously learned.

(Output Device 12)

Figure 3:
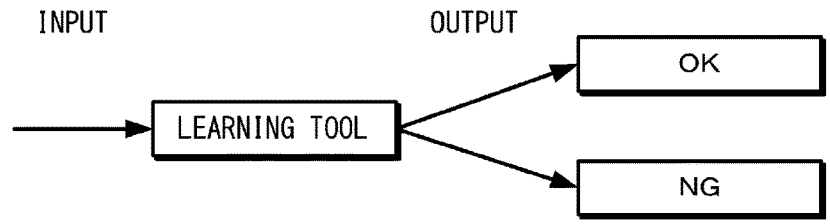
FIG. 3 is schematic view showing failure/no-failure (OK or NG) determination.
Figure 4:
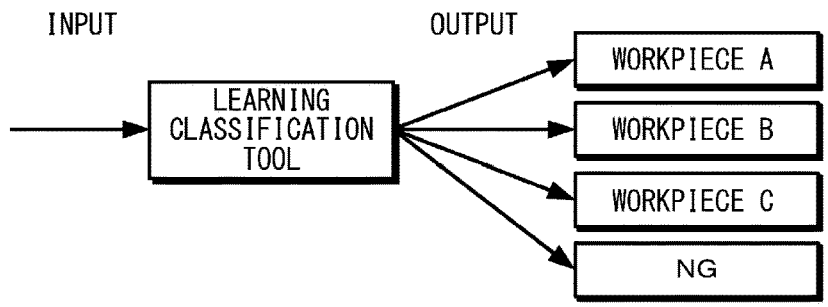
FIG. 4 is a schematic view showing classification of a no-failure product to classes.
Figure 5:
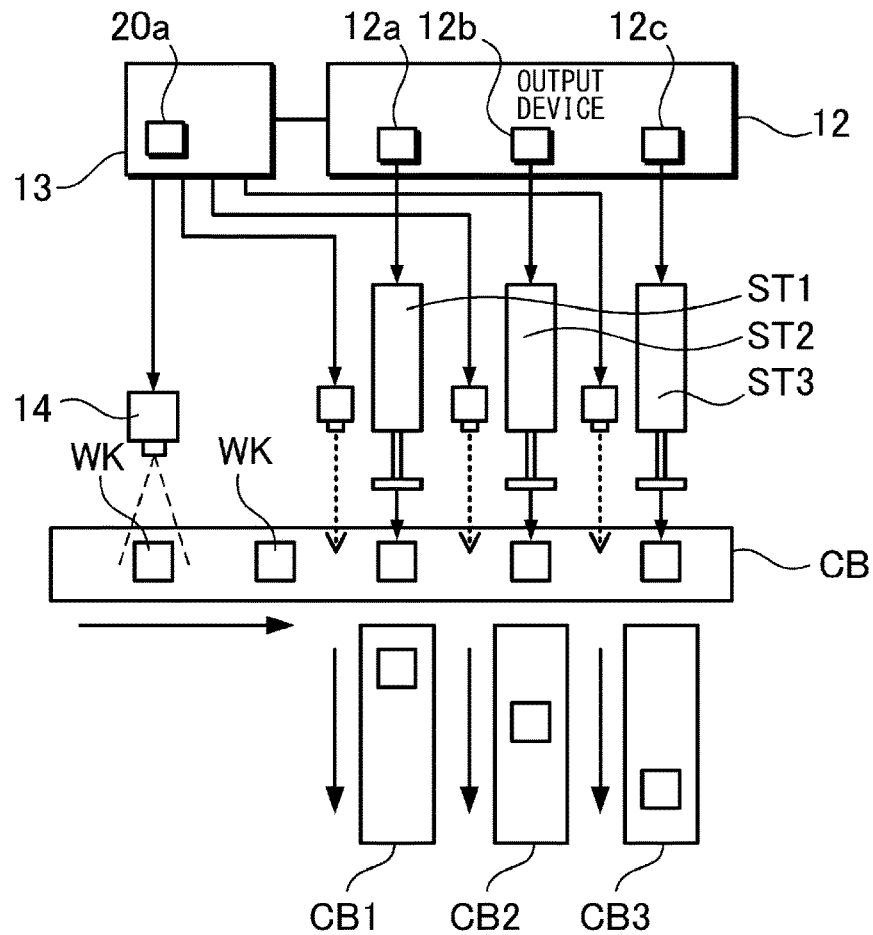
FIG. 5 is a schematic view showing classification of workpieces to classes in accordance with classification results.

The inferer 20a can provide results of the first and second inferences through the output device 12. The output device 12 includes a plurality of output ports 12a, 12b, . . . , 12n through which results of the second inference can be provided by the inferer 20a. The output ports 12a, 12b, . . . , 12n are assigned to outputs of the different types of workpiece images to which an inspection object is classified in the second inference. This output device can provide not only a binary result such as OK or NG shown in FIG. 3 but also multivalued results shown in FIG. 4. As a result, processes following the classification or grouping can be easily executed depending on the results. For example, images of inspection workpieces WK that are conveyed on a conveyor belt CB are captured one after another by the camera 14 as shown in FIG. 5, they can be classified to classes depending on a color, shape, size and the like of workpieces that are determined as a no-failure product, or to classes of very good, good, average and the like of a no-failure product (ranks). In this embodiment, outputs of the output ports 12a, 12b, . . . , 12n of the output device 12 are provided to classification devices ST1, ST2, and ST3, which classify workpieces WK from the conveyor belt CB to other downstream-side lines CB1, CB2, and CB3 in accordance with classification results that are obtained by the inferer 20a on the main board 13.

Figure 6:
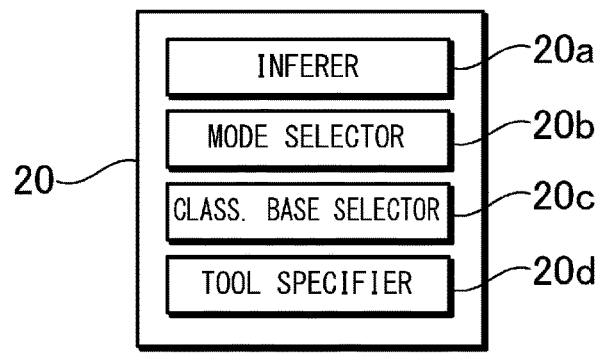
FIG. 6 is a block diagram showing functions of a processor.

FIG. 6 is a block diagram showing the processor 20. The illustrated processor 20 realizes functions of the inferer 20a, a mode selector 20b, a classification base selector 20c, and a tool specifier 20d. The inferer 20a can determine failure/no-failure of a workpiece and classify the workpiece to classes based on its workpiece image. The mode selector 20b selects a failure/no-failure determination mode in which the first inference is performed, or a classification mode in which the second inference is performed. The classification base selector 20c selects learning classification that is performed based on learning or standard classification (occasionally referred to as rule-based classification) that is performed based on a rule to be used as the second inference, which is performed by the inferer 20a. The tool specifier 20d specifies a master image and an inspection tool.

(Failure/No-Failure Determination Conditions)

Figure 7:
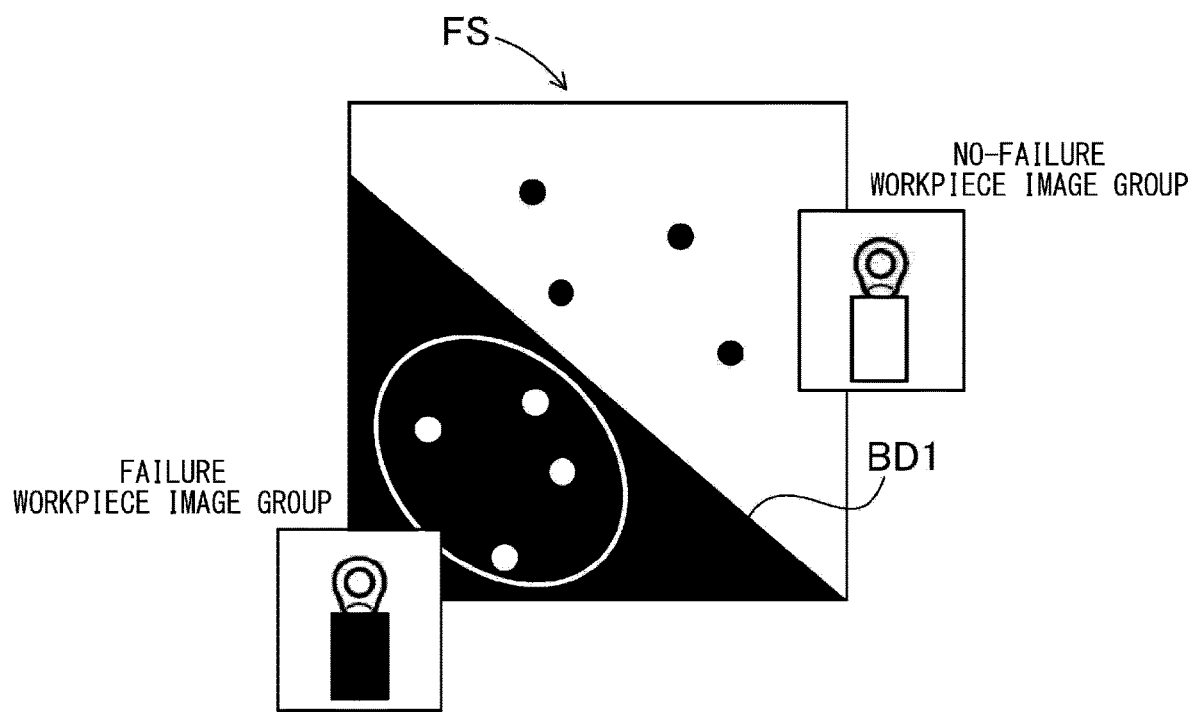
FIG. 7 is schematic view showing a feature quantity space of a neural network in which failure/no-failure determination conditions are specified.

The inferer 20a also serves as an evaluative condition specifier that specifies failure/no-failure determination conditions that are used to determine failure/no-failure of a workpiece. Exemplary specification of failure/no-failure determination conditions can be provided by specification of a failure/no-failure determination boundary, and the like. Specifically, in setting specification of the image inspection apparatus 100, failure and no-failure product images that represent failure and no-failure workpieces respectively are captured by the camera 14, and are provided to the neural network, which is stored in the learned neural network storage 19a. In this embodiment, the minimum number of failure or no-failure product image can be one. When failure or no-failure product image is provided, failure feature quantities and no-failure feature quantities that represent features of the failure or no-failure workpiece image are obtained from the neural network. Parameters of the image that can be effectively used in the failure/no-failure determination can be the failure/no-failure feature quantities, which are used in failure/no-failure determination, in feature quantities in the neural network. Such parameters can include a color, edges, locations, and the like in the image. The failure/no-failure determination boundary to be used to determine failure/no-failure of an inspection workpiece is specified or defined in a feature quantity space of the neural network based on the plurality of the failure/no-failure feature quantities. For example, failure/no-failure feature quantities of no-failure and failure product images are plotted as black and white solid circles, respectively, in a feature quantity space FS of the neural network shown in FIG. 7. A failure/no-failure determination boundary BD1 can be specified to divide the feature quantity space into no-failure and failure product areas, which include no-failure and failure products, respectively. In the exemplary feature quantity space shown in FIG. 7, products that are included in the area on the upper side with respect to the failure/no-failure determination boundary BD1 will be determined as a no-failure product, while products that are included in the area on the lower side with respect to the failure/no-failure determination boundary BD1 will be determined as a failure product.

After the aforementioned setting specification of the image inspection apparatus 100, the inferer 20*a* can perform failure/no-failure determination based on the determination conditions, which are specified in the setting specification, when the image inspection apparatus 100 is practically used for inspection. Specifically, the camera 14 captures an image of a workpiece to be inspected (inspection workpiece) that is determined whether a no-failure or failure product as an inspection workpiece image. Failure/no-failure feature quantities of the inspection workpiece image is obtained by providing the inspection workpiece image to the neural network, which is stored in the learned neural network storage 19*a*. Subsequently, coordinates of the failure/no-failure feature quantities of a workpiece image of a workpiece are compared with the failure/no-failure determination boundary, which is specified in the feature quantity space, to determine failure/no-failure of the workpiece. This failure/no-failure determination is referred to as the first inference.

(Classification Conditions)

Figure 8:
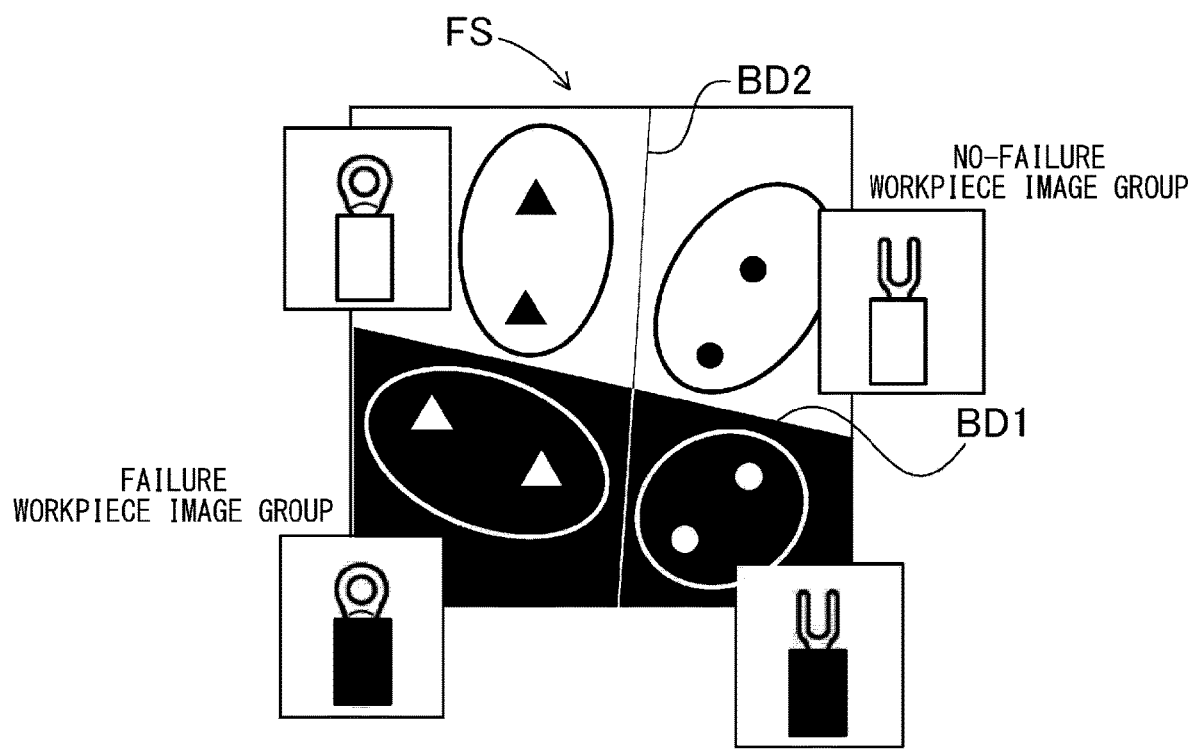
FIG. 8 is schematic view showing a feature quantity space of a neural network in which classification conditions are specified.

In addition, the inferer 20*a* classifies a workpiece that has been determined as a no-failure product in accordance with the classification conditions. The classification conditions are used to determine which type a workpiece belongs to from a plurality of types that are previously specified. The number of the types (classes) can be three or more. Such different types can be colors of workpieces. For example, colors of workpieces can be red and black, or red, yellow, and black. Alternatively, workpieces can be classified to classes in accordance with their shape, size, or the like. To address this, the inferer 20*a* also serves as a classification condition specifier that specifies classification conditions that are used to classify a workpiece to classes. Exemplary specification of classification conditions can be provided by specification of a classification boundary, and the like. Specifically, in setting specification of the image inspection apparatus 100, different types of workpiece images are captured by the camera 14, and provided to the neural network, which is stored in the learned neural network storage 19*a*, to obtain a plurality of classification feature quantities of the different types of workpiece images so that a classification boundary to be used to classify an inspection workpiece to classes corresponding to different types of workpieces is specified in the feature quantity space of the neural network based on the plurality of classification feature quantities. Parameters of the image that can be effectively used in the classification can be the classification feature quantities. Such parameters can be specified depending on types of workpieces to which an inspection workpiece is classified. For example, in the case in which an inspection workpiece is classified in accordance with its color, chromaticity or lightness in its image can be effectively used as the classification feature quantities. Also, in the case in which an inspection workpiece is classified in accordance with its shape, edges in its image can be effectively used as the classification feature quantities. Classification feature quantities can be also used as failure/no-failure feature quantities depending on depending on types of workpieces to which an inspection workpiece is classified. The classification boundary to be used to classify an inspection workpiece to classes is specified in the feature quantity space of the neural network based on the classification feature quantities. Ring and spade terminals are plotted as triangles and circles, respectively, in the feature quantity space FS of the neural network shown in FIG. 8 in exemplary classification of workpieces to ring and spade terminals in accordance with their end shapes. A classification boundary BD2 can be specified to divide the feature quantity space into ring and spade terminal areas, which include ring and spade terminals, respectively. In the exemplary classification shown in FIG. 8, ring terminals are classified to a left-side area with respect to the classification boundary BD2, while spade terminals are classified to a right-side area with respect to the classification boundary BD2.

After the aforementioned specification of the classification boundary, the inferer 20*a* can perform classification based on the classification conditions when the image inspection apparatus 100 is practically used for classification. Specifically, classification feature quantities of an inspection workpiece to be classified to classes are obtained by providing a workpiece image of the inspection workpiece that is captured before the classification to the neural network, which is stored in the learned neural network storage 19*a*. Subsequently, coordinates of the classification feature quantities of a workpiece image of a workpiece are compared with the classification boundary, which is specified in the feature quantity space, to classify the workpiece to classes. This classification is referred to as the second inference.

The learned neural network is previously prepared as discussed above so that two different inferences of the failure/no-failure determination and classification can be performed by using the common neural network. As a result, time and effort can be eliminated to establish neural networks that are used to perform their dedicated inferences. Therefore, the inference system can be simple.

In particular, in the case in which the inferer 20*a* is configured to classify an inspection workpiece that has been determined as a no-failure product in the first inference to multiple value corresponding to classes in the second inference, the inspection workpiece as a no-failure product is not only subjected to failure/no-failure determination but can be consecutively classified to classes after the failure/no-failure determination. Typical image sensors perform only failure/no-failure determination of an inspection workpiece in which the inspection workpiece is determined OK or NG. In the case in which a user who uses such a typical image sensor wants to classify the inspection workpiece to classes after the failure/no-failure determination, the user necessarily additionally prepares a number of image sensors that classify the inspection workpiece to classes. The number of classification image sensors corresponds to the number of classes that are required by the user. Contrary to this, the image inspection apparatus 100 according to this embodiment can solely perform failure/no-failure determination of an inspection workpiece and then classify the inspection workpiece to multiple value corresponding classes if the inspection workpiece is determined as a no-failure product. In addition, a workpiece that cannot be classified to any class can be determined as an NG product (failure product).

Although the inferer 20a has been illustratively described to serve as the evaluative condition specifier, which specifies the failure/no-failure determination conditions, classification conditions, and the like, the inferer according to the present disclosure is not limited to this. The inferer and the evaluative condition specifier can be separately prepared.

(Procedure of Evaluative Condition Specification)

Figure 9:
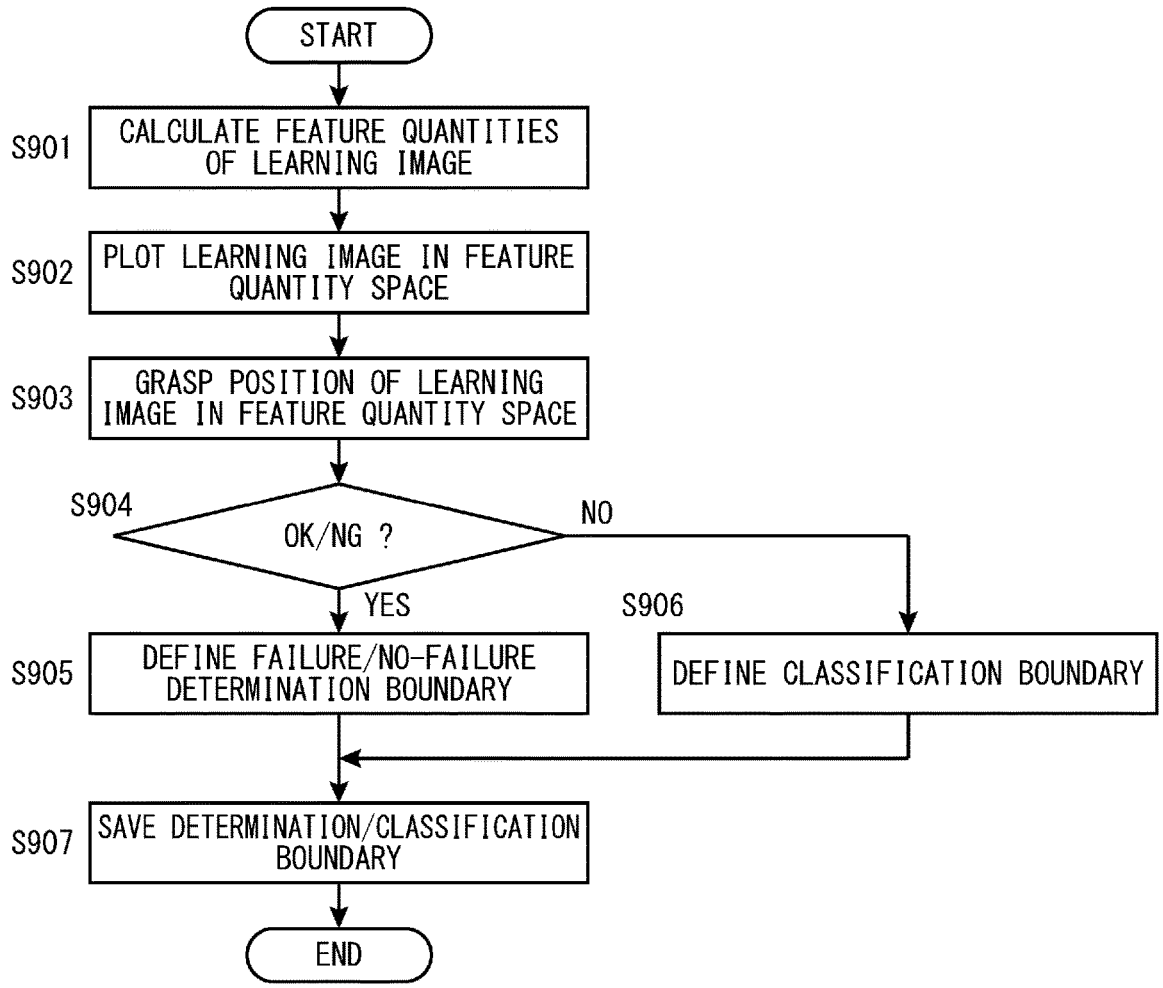
FIG. 9 is a flowchart showing a procedure of specifying the conditions in setting specification of the image inspection apparatus.

A procedure of specifying evaluative conditions by using the inferer 20a in setting specification of the image inspection apparatus 100 is now described with reference to a flowchart of FIG. 9. Feature quantities of a learning image are first calculated in Step S901. Subsequently, the feature quantities of the learning image are plotted in the feature quantity space in Step S902. Subsequently, a position of the learning image in the feature quantity space is grasped in Step S903. Subsequently, it is determined whether failure/no-failure determination is performed in Step S904. If failure/no-failure determination is performed, a determination boundary used for the failure/no-failure determination is specified in Step S905, and the procedure goes to Step S907. If it is not determined that failure/no-failure determination is performed in Step S904, the procedure goes to Step S906 in which a classification boundary used for classification is specified, and the procedure goes to Step S907. Finally in Step S907, the determination/classification boundary specified is saved. In this embodiment, the determination/classification boundary is saved and stored in the storage 19. The evaluative conditions are specified as discussed above.

(Inspection Tool)

The image inspection apparatus 100 according to this embodiment includes an inspection tool. The inspection tool specifies conditions of learning or classification.

Examples of inspection tools can be provided by a learning tool and a classification tool. The learning tool specifies conditions of failure/no-failure determination. The learning tool specifies an inspection area in master images that represent failure and no-failure products, respectively, and specifies a determination boundary. That is, the learning tool is applied to the master images in the first inference.

Figure 10:
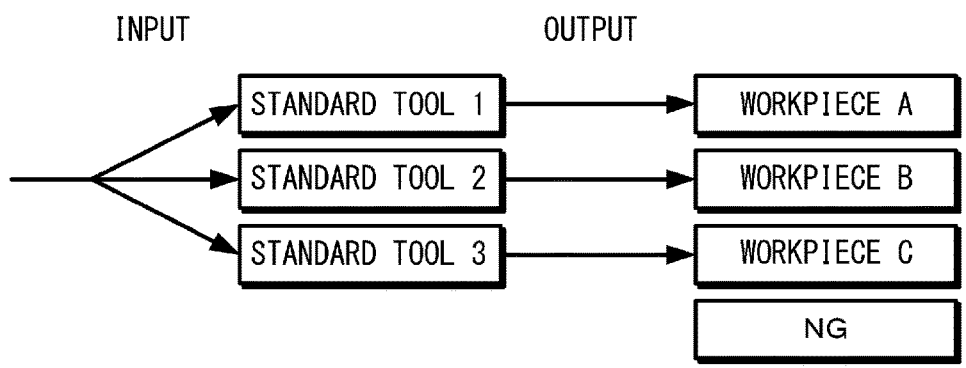
FIG. 10 is a schematic view showing a standard classification tool.

The classification tool specifies conditions of classification. The classification tool includes a learning classification tool and a standard classification tool. The learning classification tool specifies a classification-referential area in the master image to be seen in the classification and assigns the classification-referential area to the master image to be associated with one of different types of workpiece images in an entry of the master image. An inspection workpiece can be classified to classes by using a single learning classification tool as shown in FIG. 4 in the learning classification in which the classification-referential area is specified in the master image in the second inference. Contrary to this, an inspection workpiece can be classified to classes by using a plurality of tools that correspond to the different types of workpiece images in the standard classification. In other words, the standard classification tool includes a plurality of standard tools. An exemplary standard classification tool shown in FIG. 10 includes standard tools 1, 2, and 3. Correspondingly, an inspection workpiece will be determined as one of workpieces A, B, and C. In this exemplary standard classification tool, if an inspection workpiece will be determined as a workpiece A, the classification result is provided from the standard tool 1. If an inspection workpiece will be determined as a workpiece B, the classification result is provided from the standard tool 2. If an inspection workpiece will be determined as a workpiece C, the classification result is provided from the standard tool 3. If an inspection workpiece is not determined as any of the workpieces A, B, and C, the inspection workpiece is determined as an NG product, and no output is provided.

In this embodiment, classification is performed by applying the single learning classification tool to a workpiece image of an inspection workpiece in the learning classification, while classification is performed by applying the plurality of standard tools, which correspond to the different types of workpiece, to a workpiece image of an inspection workpiece one after another in the standard classification. In the exemplary standard classification tool shown in FIG. 10, the standard tools 1 to 3 are executed one after another so that their classification results are provided as outputs. Although their classification results can be clearly known in the standard classification, settings of the plurality of standard tools are necessarily specified.

(Selection of Inspection Mode)

Figure 11:
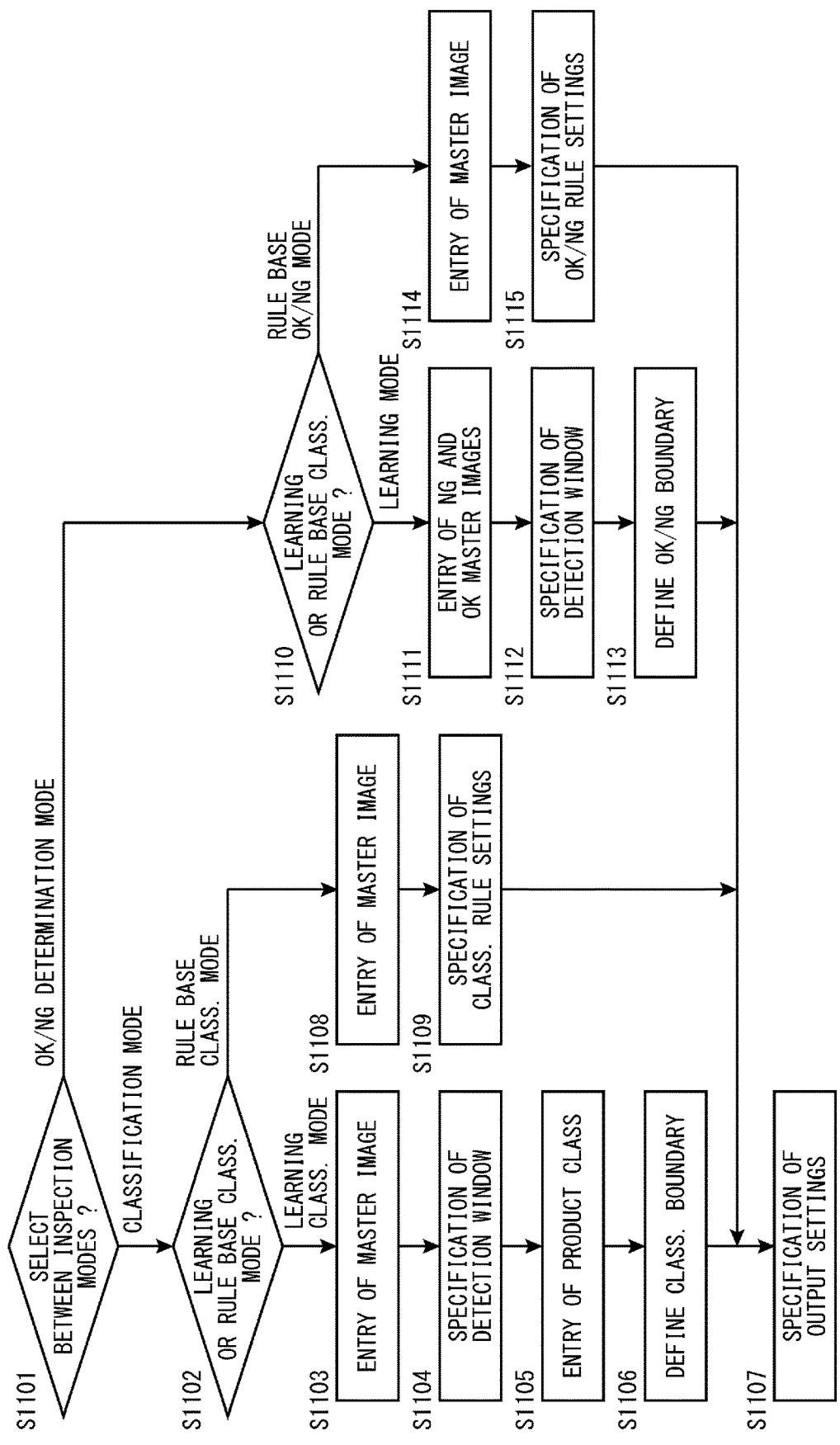
FIG. 11 is a flowchart showing a procedure of selecting between inspection modes.

A procedure of selecting between the classification mode and the failure/no-failure determination mode as an inspection mode is now described with reference to a flowchart of FIG. 11. The mode selector 20b of the processor 20 shown in FIG. 6 first receives selection between the failure/no-failure determination mode and the classification mode from a user in Step S1101. If the user selects the classification mode, the mode selector 20b then receives selection between the learning classification mode and the standard classification mode in Step S1102.

The learning classification mode refers to a classification mode in which the learning classification, which uses machine learning that is executed in the neural network as discussed above, is used to classify an inspection workpiece to classes. The standard classification mode refers to a mode classification mode in which a rule that uses feature quantities such as an outline and color of an inspection workpiece is used to classify the inspection workpiece to classes without using the neural network.

If the learning classification mode is selected in Step S1102, the processor 20 then receives an entry of a master image (Step S1103). The master image can be captured in the entry by the camera 14, or be a history image that has been captured in previous practical operation or a file image that has been stored in the storage 19.

Subsequently, the user specifies one or a plurality of detection windows as an area to be inspected (inspection area) on the master image (Step S1104). Image parts that are specified by detection windows are provided to the aforementioned neural network so that feature quantities of the detection window are provided from the neural network.

Subsequently, the user enters a product class corresponding to the master image the parts of which have been specified by the detection windows (Step S1105). For example, in the case in which a user enters a red ballpoint pen as a product class, the master image is entered as a product class of "red ballpoint pen". The product class entered is associated with the feature quantities of the detection window that are provided from the neural network, and is stored in the storage 19. Although the number of the images corresponding to one of product classes can be one, a plurality of images corresponding to a plurality of red ballpoint pens can be entered as master images corresponding to the product class of red ballpoint pen. For example, in the case in which red ballpoint pens that have slightly different red colors are entered as the red ballpoint pen class, if a ballpoint pen that has a color close to red is classified to product classes in practical operation, the ballpoint pen can be determined as a "red ballpoint pen".

In order to classify an inspection workpiece to product classes, two or more product classes are necessarily entered.

For example, in the case in which an inspection workpiece is classified to product classes of red and blue ballpoint pens, a master image corresponding to a blue ballpoint pen is required to be additionally entered and associated with its feature quantities of a detection window that are provided from the neural network so that the "blue ballpoint pen" product class stored in the storage 19.

The storage 19 stores master images corresponding to product classes, feature quantities that are extracted from the master images, and the product classes with which the master images are associated. After that, if an instruction to start learning is received from the user, a classification boundary that is required to classify an inspection workpiece to product classes is calculated (Step S1106). It is noted that the learning that is instructed in Step S1106 is not learning in the neural network that learns its own parameters but learning that learns relations between the master images corresponding to product classes and their feature quantities of the master images that are provided from the already learned neural network, which is stored in the storage 19, to calculate a classification boundary used to classify an inspection workpiece to product classes. Subsequently, output settings are specified in Step S1107. The output settings will be discussed in more detail later.

If the rule base classification mode is selected in Step S1102, the procedure goes to Step S1108 in which an entry of a master image is received. Subsequently, classification rule settings are specified in Step S1109. In the classification rule setting, settings of a color or outline tool are specified. The color tool can determine a color in a detection window of the master image entered. The outline tool can detect an outline in a detection window of the master image entered. A classification rule to classify a workpiece to classes can be specified based on a color that is determined in the detection window in the case in which the color tool is selected, or based on information about an outline that is detected in the detection window in the case in which the outline tool is selected. If the rule base classification mode is selected in Step S1102, feature quantities that are specified by the user are extracted from an image of a workpiece without using the neural network to achieve the aforementioned obtainment of feature quantities.

If the user selects the failure/no-failure determination mode in Step S1101, the procedure goes to Step S1110 in which learning base or rule base failure/no-failure determination mode is selected. In this embodiment, the user can select whether learning base or rule base failure/no-failure determination mode is performed. In the case in which the user selects an inspection tool for the learning base failure/no-failure determination mode, settings of the learning failure/no-failure determination mode can be specified. In the case in which the user selects an inspection tool for the rule base failure/no-failure determination mode, settings of the rule base failure/no-failure determination mode can be specified.

If the learning failure/no-failure determination mode is selected in Step S1110, the processor 20 then receives entries of master images that represent no-failure and failure product images (Step S1111). Subsequently, a detection window is specified on the master image (Step S1112). Subsequently, image parts in detection windows that are specified on the master images are provided to the neural network so that the neural network provides feature quantities that represents a no-failure product image and feature quantities that represents a failure product image, The no-failure product image feature quantities and the failure product image feature quantities are then mapped on the feature quantity space so that a determination boundary used to determine a no-failure or failure product is automatically defined (Step S1113). Although the number of the images of a no-failure or failure product can be one, a plurality of images of a no-failure or failure product can be entered as master images of a no-failure or failure product similar to the aforementioned learning classification mode.

If the inspection tool for the rule base failure/no-failure determination mode is selected in Step S1110, an entry of a master image is received in Step S1114. Subsequently, settings of the rule base inspection tool, such as outline and color tools, are specified in Step S1115.

In this embodiment, users can specify settings of one of the four inspection modes as discussed above. The four inspection modes are the learning classification mode (first classification mode), the rule base classification mode (second classification mode), the learning failure/no-failure determination mode (first failure/no-failure determination mode), and the rule base failure/no-failure determination mode (second failure/no-failure determination mode). In the learning classification mode (first classification mode), a classification boundary can be defined by providing images of different product classes to the already learned neural network. In the rule base classification mode (second classification mode), a workpiece is classified to product classes in accordance with its color or outline information. In the learning failure/no-failure determination mode (first failure/no-failure determination mode), no-failure and failure product images are provided to the already learned neural network so that a failure/no-failure determination boundary is defined. In the rule base failure/no-failure determination mode (second failure/no-failure determination mode), failure/no-failure determination of a workpiece is performed based on its color or outline information. The mode selector 20*b* can select between the inspection modes.

The common neural network that is used to extract feature quantities can be used in both the aforementioned learning classification and failure/no-failure determination modes. Only the single neural network that has learned and is stored in the image inspection main unit can be used to perform both the learning classification mode that receives entries of products corresponding to three or more product classes and classifies a workpiece to the three or more product classes and the failure/no-failure determination mode that learns no-failure and failure product images and determines failure/no-failure of a workpiece.

Figure 12:
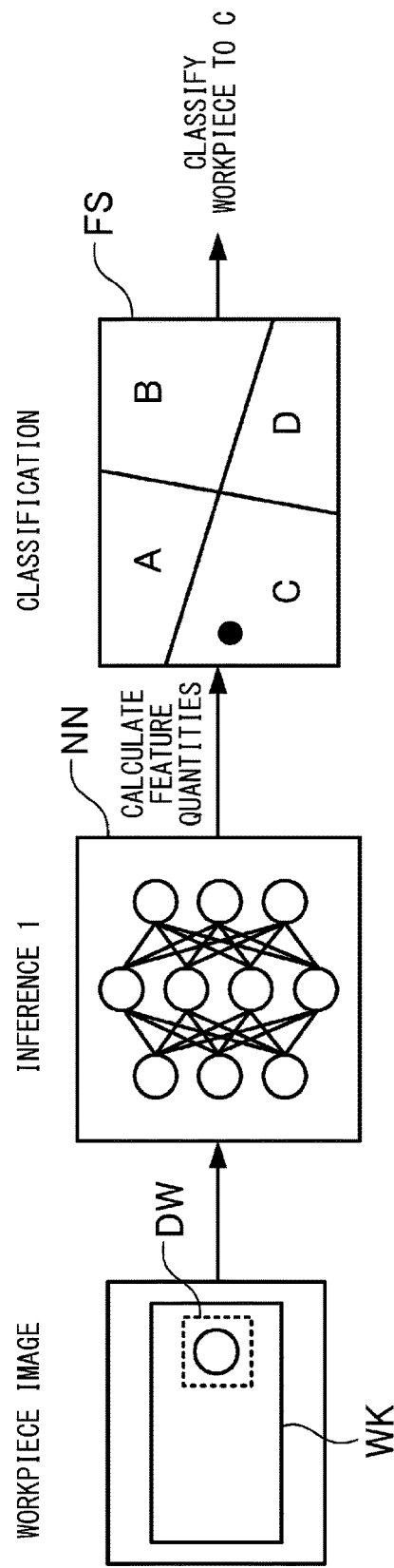
FIG. 12 is a schematic view showing classification, which is performed by using the neural network.
Figure 13:
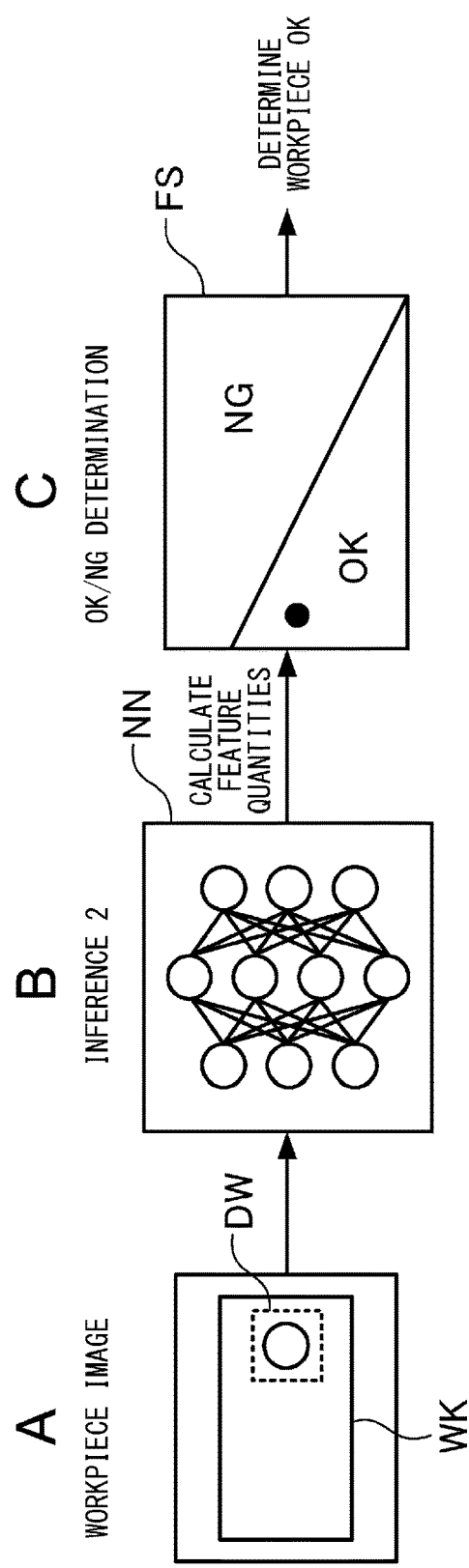
FIG. 13 is a schematic view showing failure/no-failure determination, which is performed by using the same neural network as FIG. 12.

FIGS. 12 and 13 are schematic views showing the classification and failure/no-failure determination, which are performed by using the common neural network. Parts A in FIGS. 12 and 13 show that a detection window DW is specified on a workpiece image captured of a workpiece WK. Parts B in FIGS. 12 and 13 show an inference that is performed by the neural network. Parts C in FIGS. 12 and 13 show classification or failure/no-failure determination that is performed in the feature quantity space FS. A neural network NN shown in FIGS. 12 and 13 is an already learned common neural networks NN, which is stored in the storage 19 and is commonly used in both the classification and failure/no-failure determination. The inference processing that performs classification and the failure/no-failure determination is executed by providing the already learned neural network NN with an image part in a detection window DW shown in the parts A of FIGS. 12 and 13. The image inspection main unit stores the already learned neural network NN in the learned neural network storage 19*a* of the storage 19. The processor 20 includes a dedicated circuit that executes the inference processing. The dedicated circuit executes the inference processing relating to the classification and the failure/no-failure determination. The processor 20 does not execute learning processing of the neural network's NN but mainly execute the inference processing. For this reason, a heavy load will not be placed on the processor 20.

The image part in the detection window DW shown in the part A of FIG. 13, which is previously specified, is provided to the already learned neural network NN shown in the part B of FIG. 13 to extract feature quantities of the image part in the learning failure/no-failure determination. The feature quantities extracted are mapped on the feature quantity space FS shown in the part C of FIG. 13, and are compared with respect to a determination boundary that is specified in the feature quantity space FS so that a failure/no-failure determination result is provided (first inference).

The image part in the detection window DW shown in the part A of FIG. 12, which is previously specified, is provided to the already learned neural network NN shown in the part B of FIG. 12 to extract feature quantities of the image part in the learning classification. The feature quantities extracted are compared in the feature quantity space FS shown in the part C of FIG. 12 with respect to a classification boundary that is specified in the aforementioned classification boundary specification to determine which type the workpiece belongs to so that a classification result is provided (second inference).

Because only the image part in the detection window DW is provided to the neural network NN to extract feature quantities of the image part in the failure/no-failure determination and the classification, a load of the inference processing can be reduced. Also, because image parts other than the detection window DW do not cause performance reductions of the failure/no-failure determination and the classification, inspection can be stably performed.

Although the common neural network has been illustratively described to be used in both the failure/no-failure determination and the classification, needless to say, neural networks can be separately provided to be independently used depending on the failure/no-failure determination and the classification.

(Classification GUI)

Figure 14:
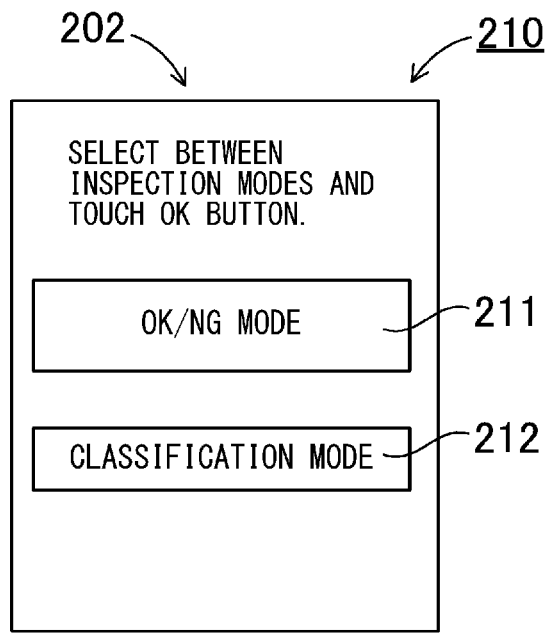
FIG. 14 is a schematic view showing a mode selection screen in which an "OK/NG Mode" button is selected.
Figure 15:
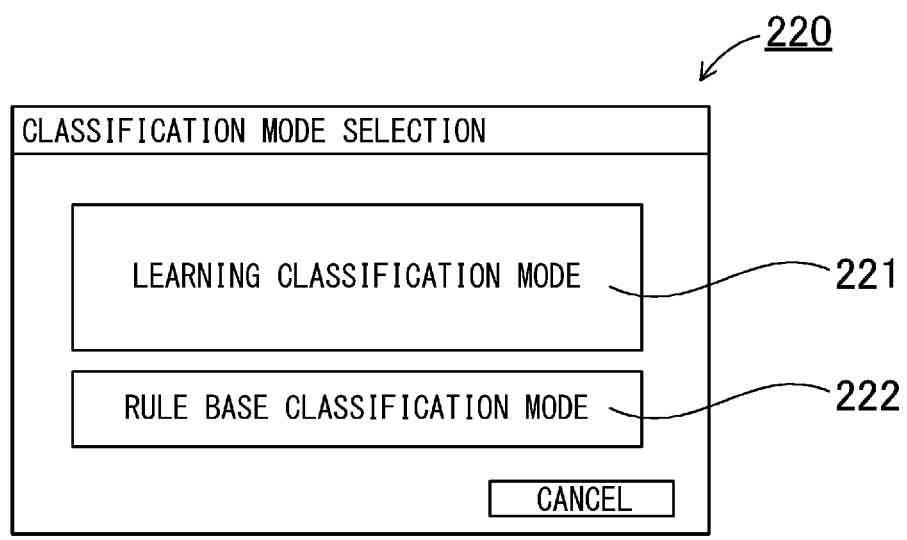
FIG. 15 is a schematic view showing a classification mode screen.

A procedure of specifying evaluative conditions using the inspection tool is now described with reference to exemplary user interface screens of the image inspection program shown in FIGS. 14 to FIG. 21. Users first select specification of failure/no-failure determination conditions or classification conditions. FIG. 14 is a schematic view showing an exemplary mode selection screen 210. An "OK/NG Mode" button 211 and a "Classification Mode" button 212 are provided in the mode selection screen 210. When the "OK/NG Mode" button 211 is selected, a message appears saying "Enter OK Workpiece Image as Master Image, & Select Tool for Extracting Features (e.g., Outline, Area, and Edge). This Mode can Determine Difference between Sample & Master Image.", for example. When the "Classification Mode" button 212 is selected, a message appears saying "Enter Product Class Images as Master Images to Determine Product Class of Sample Based on Its Features. This Mode can Classify Sample Based on Features Determined.", for example. These selective buttons, which are indicated to enhance users to select between items, and these messages, which explain the items by using text or graphics, can guide users, who may be inexperienced at settings or operations, step by step through a proper setting procedure and through the explanations so that users can properly specify settings of evaluative conditions.

(Easy Setting)

Setting specification of classification conditions includes easy setting in which a procedure of specifying classification conditions is simplified, and custom setting that allows users to directly specify setting items. If the "Classification Mode" button 212 is clicked in FIG. 14, for example, the screen changes to a classification mode screen 220 shown in FIG. 15 in which a "Learning Classification Mode" button 221 and a "Rule Base Classification Mode" button 222 are indicated. Users can select easy setting or custom setting on the classification mode screen 220. If the "Learning Classification Mode" button 221 is clicked, easy setting starts so that a learning classification tool is displayed. Setting specification of classification conditions that uses the learning classification tool includes setting specification of image capture conditions, entries of master images, entries of product classes, and assignment of outputs. In the setting specification of image capture conditions, users can specify an imaging field of view, image brightness, focus, and the like as image capture conditions under which inspection images are captured by the camera 14.

Figure 16:
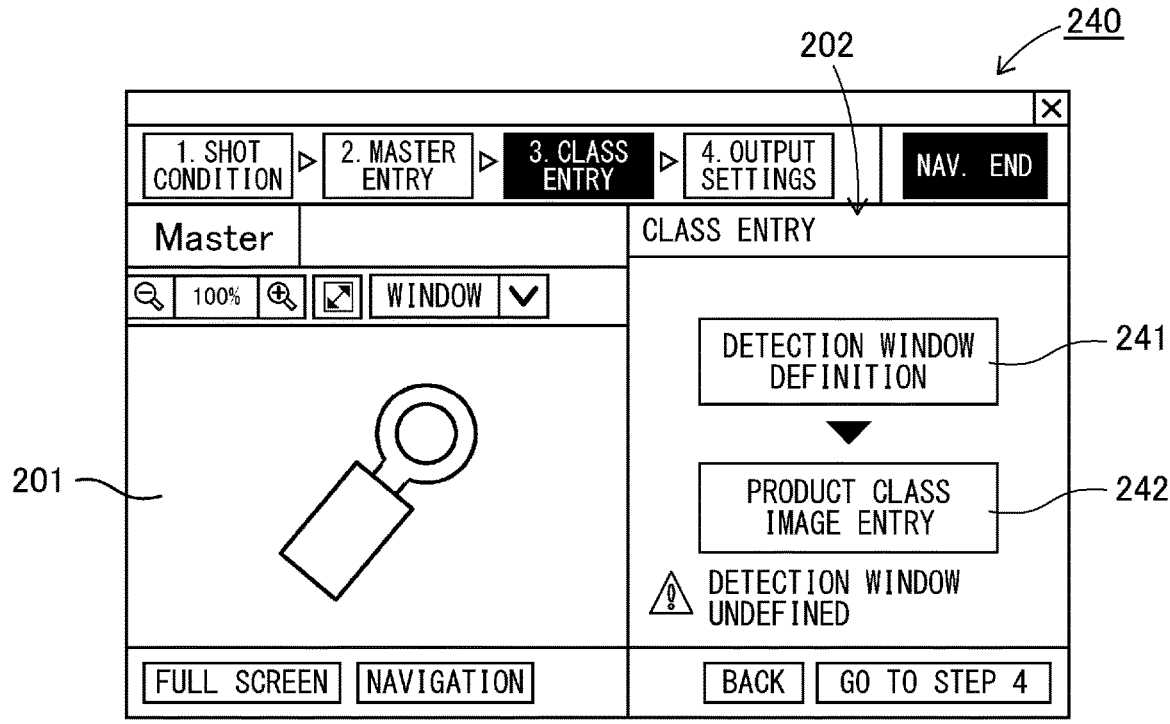
FIG. 16 is a schematic view showing a tool specification screen.
Figure 17:
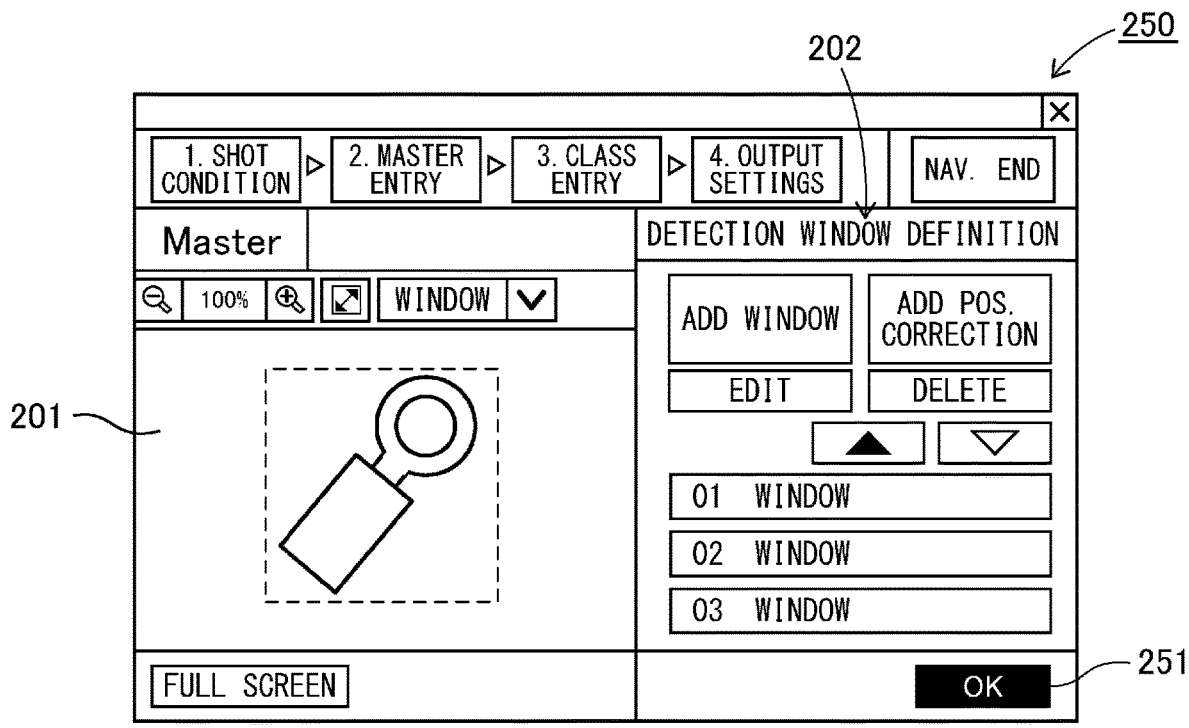
FIG. 17 is a schematic view showing a detection window specification screen.
Figure 18:
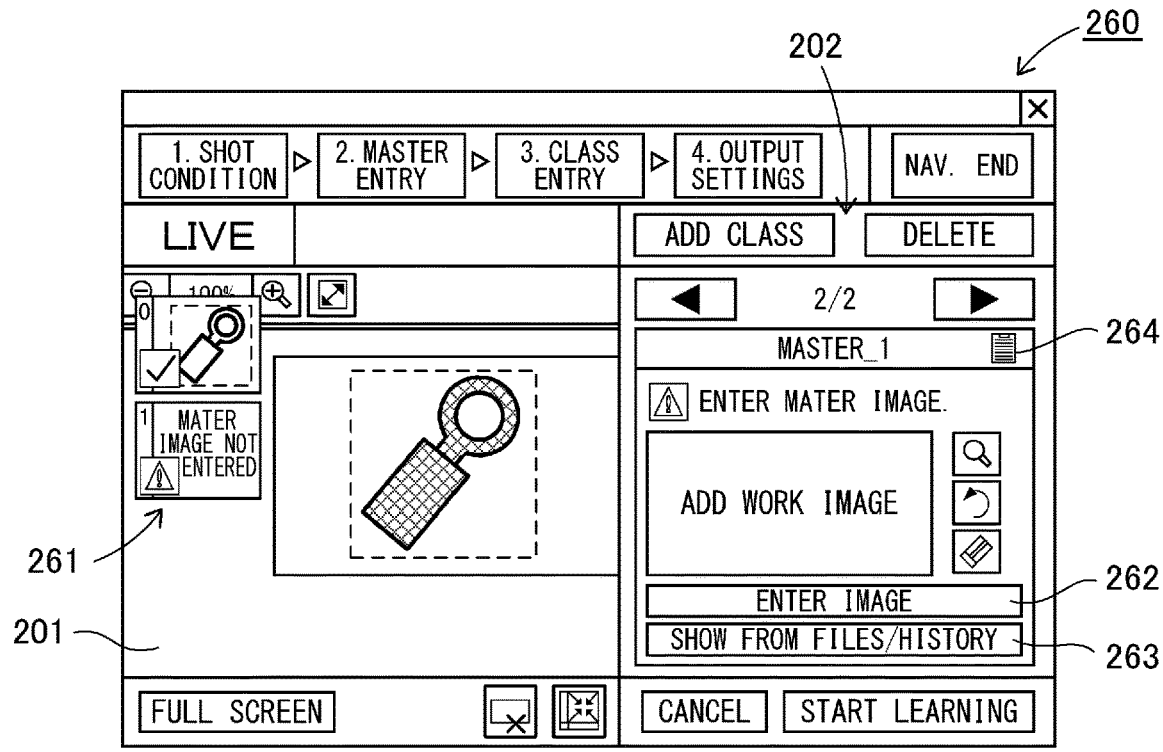
FIG. 18 is a schematic diagram showing a product class entry screen.

The image inspection program includes a navigation function that guides users through setting specification in the easy setting. The navigation function shows a flow of processes, which are indicated as items, in an upper ribbon of the screen as shown in FIG. 16, etc., for example. One of the item that is currently selected to specify settings of its corresponding process is highlighted in the upper ribbon so that users can easily know the progress of setting specification.

Master images can be entered on a master image entry screen. The master image entry screen can receive an entry of a master image from which an inspection area is specified. The inspection area can be specified by a rectangular window. In the case in which brightness of images to be inspected varies, a plurality of images of a product corresponding to one of product classes are captured with different brightness levels, and entered as a plurality of master images of the one product class. The plurality of master images of the one product class can provide reliable inspection of an inspection workpiece even if an image of the inspection workpiece is captured with any brightness level. A master image can be entered by capturing a live image of a product corresponding to one of product classes, by selecting a history image that has been captured in previous practical operation or a file image that has been stored in the storage, for example. FIG. 16 is a schematic view showing an exemplary tool specification screen 240. On the tool specification screen 240, an inspection area can be specified from the master image entered, and a product class corresponding to the master image entered can be entered. A "Detection Window Definition" button 241 and a "Product Class Image Entry" button 242 are provided in an operator area 202, which is located in a right-side part of the tool specification screen 240 shown in FIG. 16. If the "Detection Window Definition" button 241 is clicked, the screen changes to a detection window specification screen 250 shown in FIG. 17 in which users can specify or define a rectangle as the inspection area in an image display area 201 by using an input device, such as a mouse. A plurality of inspection areas can be specified. Inspection areas that have been specified are indicated as rectangles in the image display area 201. The Inspection areas that have been specified are attached with their identification numbers and listed in the operator area 202. In the exemplary screen shown in FIG. 17, three windows have been specified as the inspection areas and listed in the operator area 202. If a user completes specification of all the inspection areas, the user can click on an "OK" button 251, which is located in a bottom right part of the tool specification screen 240 so that specification of inspection areas ends.

Product classes to which workpieces are classified can be entered on a product class entry screen. If the "Product Class Image Entry" button 242 is clicked on the tool specification screen 240 shown in FIG. 16, the screen changes to an exemplary product class entry screen 260 shown in FIG. 18. Users can enter product classes and images corresponding to the product classes on the product class entry screen 260. As a result, a classification boundary is specified. In this embodiment, specification of a classification boundary occasionally referred to as "learning". The images that have been entered are displayed as thumbnails and listed in a product class image display field 261, which is located in a left-side part of the image display area 201.

Figure 19:
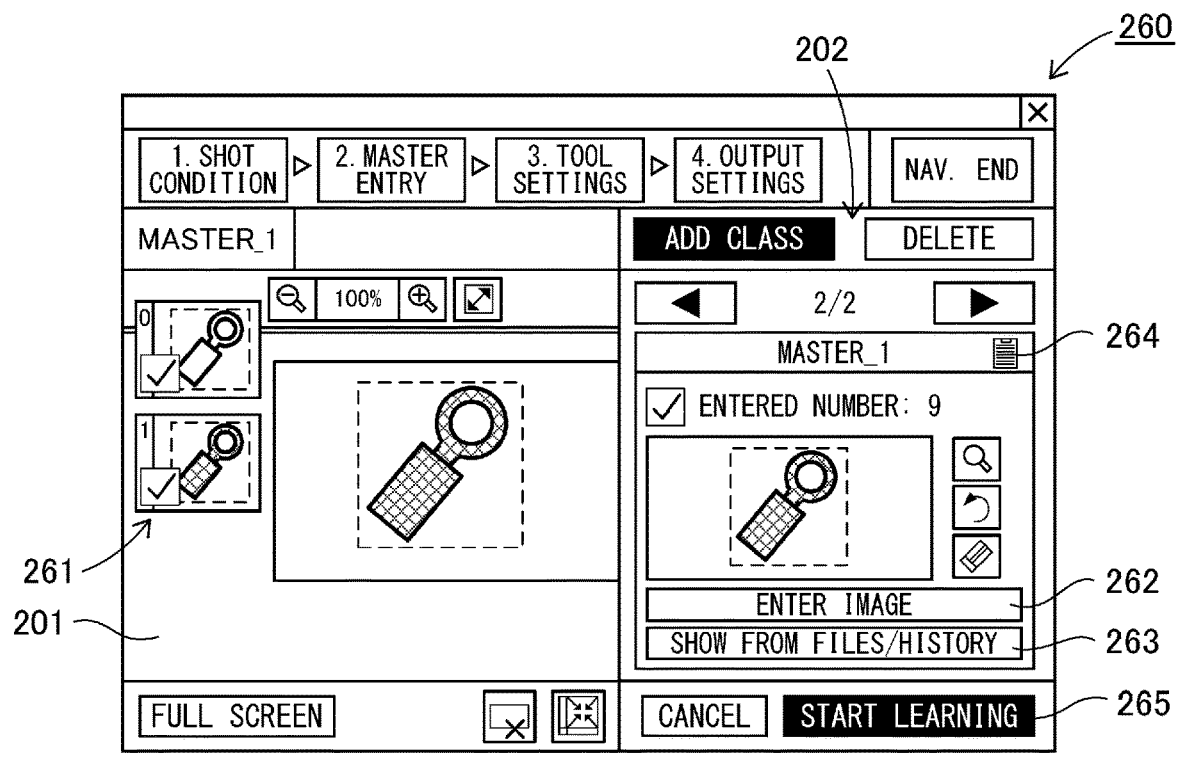
FIG. 19 is a schematic diagram showing the product class entry screen in which a product class entry screen is additionally entered through the screen shown in FIG. 18.
Figure 20:
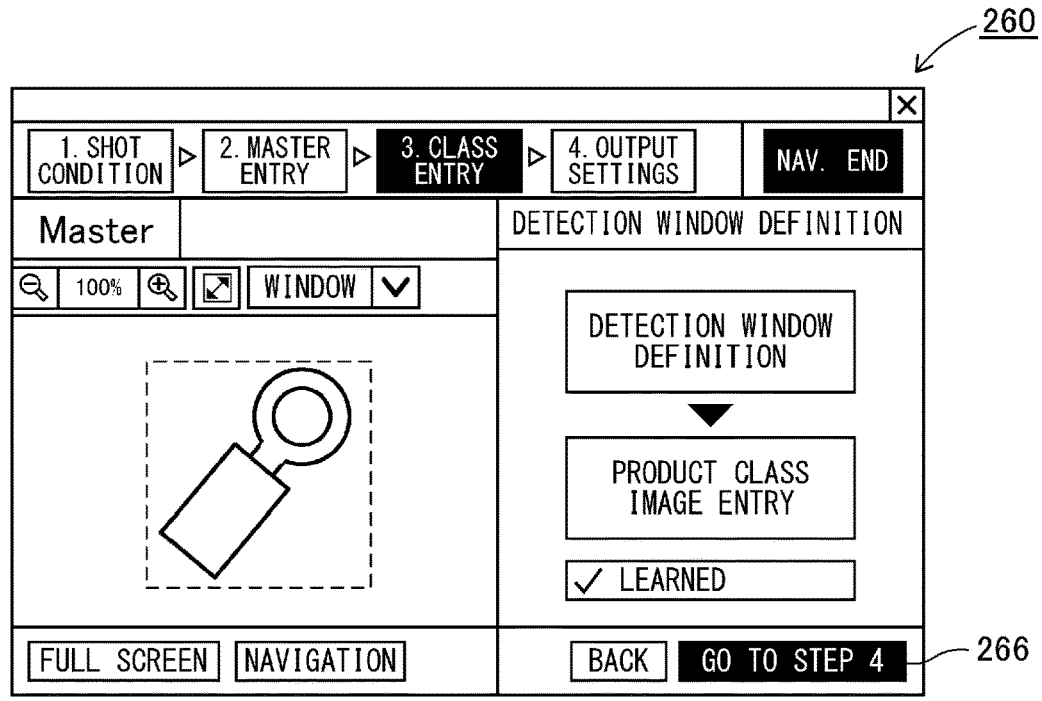
FIG. 20 is a schematic diagram showing a product class entry screen in which a learned product is displayed.
Figure 21:
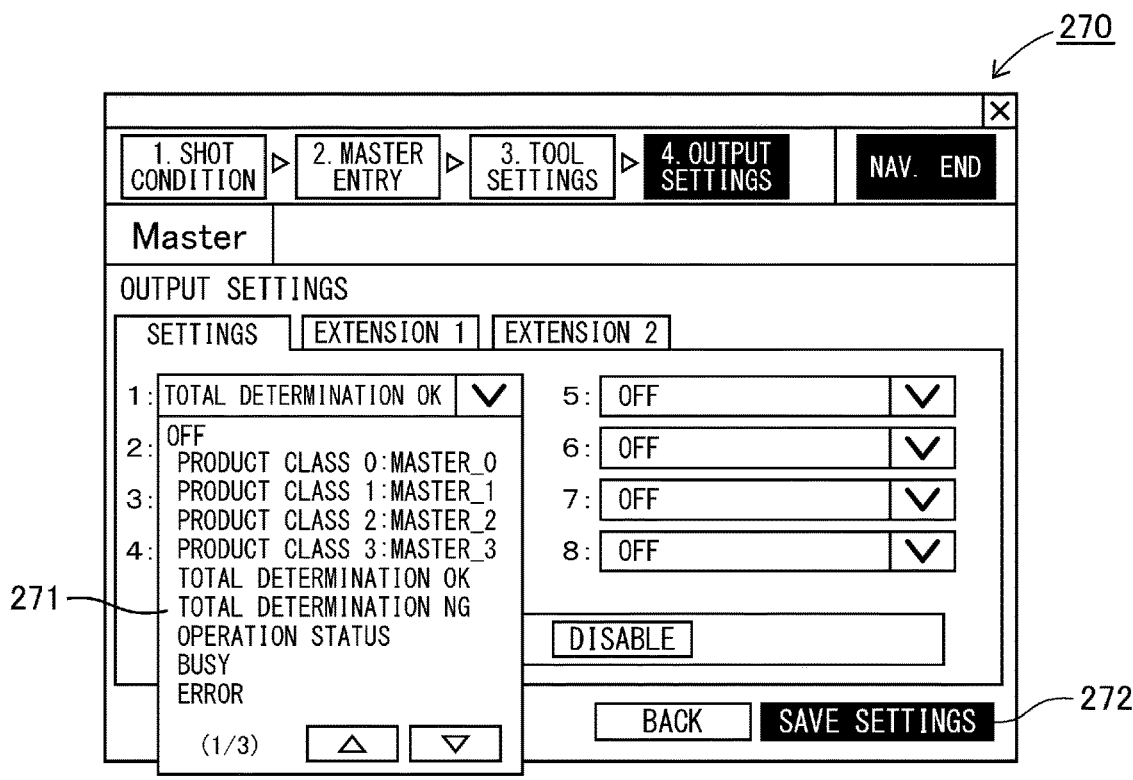
FIG. 21 is a schematic diagram showing an output assignment screen.

In this entry of a product class, one product class can be assigned to a master image that has been entered. In other words, master image that has been entered is associated with one of product classes. In the exemplary product class entry screen 260 shown in FIG. 18, a master image that has been entered and associated with a first product class (entered as a first product class image) is displayed the product class image display field 261, which is located in a left-side part of the image display area 201, and attached with an identification number 0. Because a first product image has been entered, an image corresponding to a second product class image is then entered. An image corresponding to a product class to be added can be entered by clicking an "Enter Image" button 262, which is arranged in the operator area 202 shown in FIG. 18. If a user clicks on the "Enter Image" button 262, the image that is displayed in the image display area 201 in an exemplary product class entry screen shown in FIG. 19 is entered as a product class image. For example, after a workpiece corresponding to a product class to be entered is placed and its image is captured by the camera 14 of the image inspection apparatus 100, the image of the workpiece is displayed as a live image in the image display area 201 shown in FIG. 18, and is then entered as the second product class image. As a result, the second product class image is then displayed as a thumbnail that is attached with an identification number 1, and is listed in the product class image display field 261 in the image display area 201 in the exemplary product class entry screen shown in FIG. 19. Also, product class images can be entered not only from a live image but also be reentered from images that were entered as product class images and have been removed from the product class images. For example, it a user clicks on a "Show from Files/History" button 263, which is arranged in a lower part of the operator area 202, on the product class entry screen 260 shown in FIG. 18, images that have been captured before and saved are displayed. The user can then select from the images to enter the image selected as a product class image.

A product class image corresponding to product class can be attached with a name of the product class in an entry of the product class image. The product class image is automatically attached with a name "MASTER_1" in the exemplary product class entry screens 260 shown in FIGS. 18 and 19. Also, users can attach product class images with arbitrary product class names. For example, if a user clicks on a memo icon 264, which is arranged in the operator area 202, in the exemplary product class entry screen 260 shown in FIG. 18, etc., the user can edit the product class name.

After product class images corresponding to a plurality of (i.e., two or more) product classes are entered, learning (specification of a classification boundary in this case) can start. If a user clicks on a "Start Learning" button 265, which is arranged in a lower right-side part of the product class entry screen 260 of FIG. 19, a classification boundary can be specified in a feature quantity space based on the product class images that have been entered. If a product class name is entered but a product class image corresponding to the product class name entered is not entered, learning cannot be performed so that the "Start Learning" button 265 is in active and grayed out.

After entries of product classes are completed, outputs are finally assigned. For example, when learning is completed and the classification boundary is specified so that entries of product classes are completed, a "Go to STEP 4" button 266 shown in a lower right-side part of an exemplary product class entry screen shown in FIG. 20 becomes active. If the "Go to STEP 4" button 266 is clicked, the screen changes to an exemplary output assignment screen 270 shown in FIG. 21. On the output assignment screen 270, users can assign output items to the output ports. Examples of the output items that can be assigned to the output ports can be provided by information about product classes specified, failure/no-failure determination result (OK or NG), operation status, busy, error, no-output, and the like. Users can select an output item that is assigned to each output port from a number of output items. A setting field 271 corresponding to an output port 1 is shown as a pull-down menu that allows users to select one from the output items in the exemplary output assignment screen 270 shown in FIG. 21. If all of necessary evaluative conditions are specified, users can click on a "Save Settings" button 272 to complete the setting specification so that the evaluative conditions specified are saved in the storage 19.

(Custom Setting)

The above description has described easy setting. Custom setting that specifies settings of rule base classification is now described. A workpiece is classified to classes based on feature quantities (e.g., colors, and outlines) that are specified by a user without using the neural network in the rule base classification. If rule base classification is selected in Step S1102 in FIG. 11 by clicking on the "Rule Base Classification Mode" button 222, for example, on the classification mode screen 220 shown in FIG. 15, classification rule settings are specified in Step S1109. In the setting specification of rule base classification, settings of the rule base inspection tool, such as a color tool and an outline tool, can be specified depending on feature quantities that are used in inspection.

Figure 22:
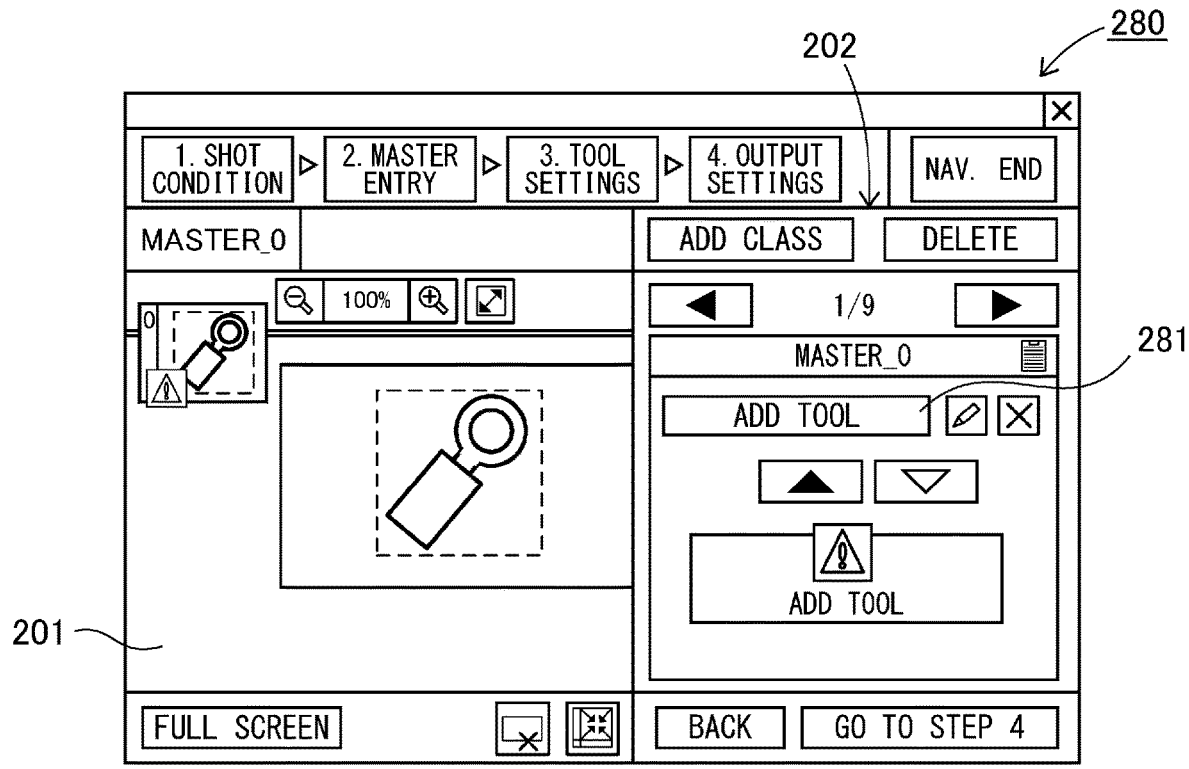
FIG. 22 is a schematic diagram showing a product class entry screen in which custom settings are specified.
Figure 23:
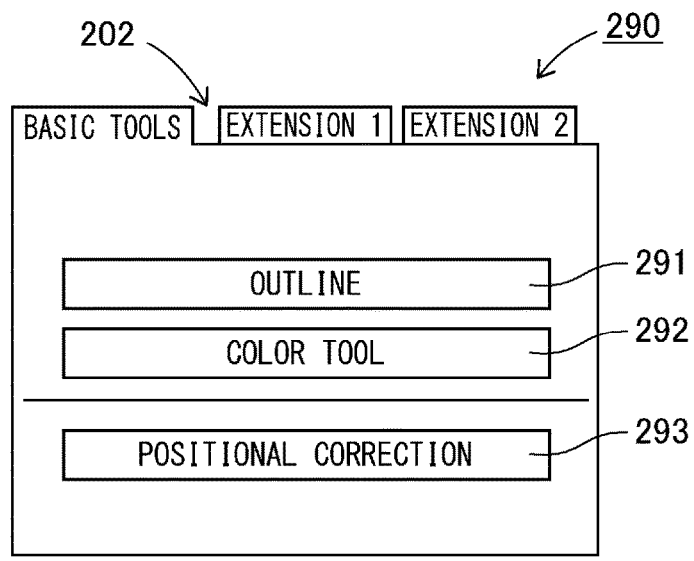
FIG. 23 is a schematic view showing a tool addition screen.
Figure 24:
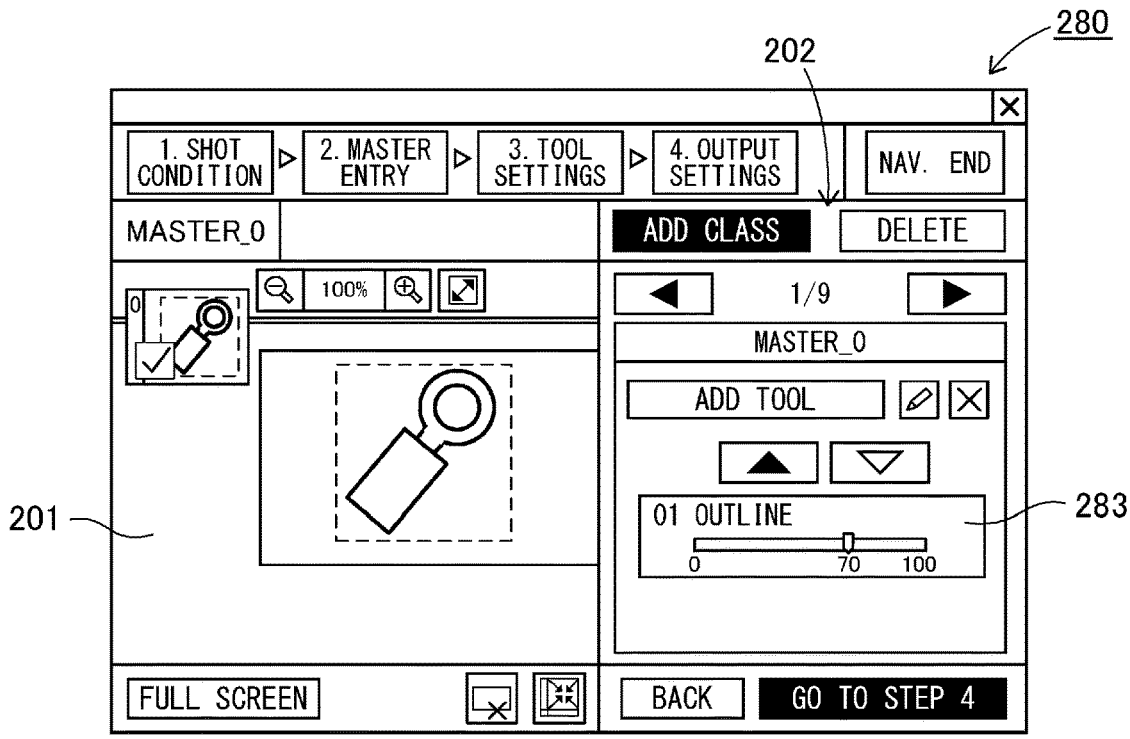
FIG. 24 is a schematic diagram showing a product class entry screen in which an outline tool is selected to be specified.

An "Add Tool" button 281 is provided in the operator area 202 in an exemplary product class entry screen 280 shown in FIG. 22, which is used in the setting specification of rule base classification. If the "Add Tool" button 281 is clicked, the screen changes to an exemplary tool addition screen 290 shown in FIG. 23. On the tool addition screen 290, the user can select which feature quantity is used for classification. An "Outline" button 291, a "Color Tool" button 292, and a "Positional Correction" button 293 are provided as basic tools in the operator area 202 in the exemplary tool addition screen 290 shown in FIG. 23. Feature quantities relating to an outline, colors, or a position of a workpiece image can be specified if the user selects the "Outline" button 291, the "Color Tool" button 292, or the "Positional Correction" button 293, respectively, for advanced settings. For example, if the "Outline" button 291 is selected, the screen changes to an exemplary product class entry screen 280 of FIG. 24. The product class image attached with its identification number 0, and its product class name "MASTER_0" have been entered. The name "MASTER_0" is indicated in the operator area 202, and a feature quantity corresponding to an outline of the product class image can be specified in an outline tool 283 attached with a feature quantity number 01 on this product class entry screen 280. A threshold can be specified by the outline tool 283. In this embodiment, a threshold relating to concordance degree between outlines of an inspection workpiece image and the master image can be specified within a range of 0 to 100 by using a slider of the outline tool 283. For example, we can consider the case in which when an outline is detected in a detection window that is specified on an input image of an inspection workpiece to be classified (classification workpiece image) a length of the outline detected does not agree with a length of the same outline that is detected in a detection window specified on the master image, or the outline detected of the classification workpiece image is partially missing. If the user expects to determine such a classification workpiece image as the product class corresponding to the master image, the user can specify or set a relatively low threshold relating to outline concordance degree. More specifically, if the user requires determining a classification workpiece image as the product class corresponding to the master image (determining OK) unless greater than a quarter of the outline detected of the classification workpiece image is missing, the user can specify a threshold of "75". After the user can specify such a threshold that is specified corresponding to a product class of a master image, an inspection workpiece is determined as the product class and a classification result of OK is provided if a concordance degree between an input image of the inspection workpiece and the master image is not smaller than the threshold.

Figure 25:
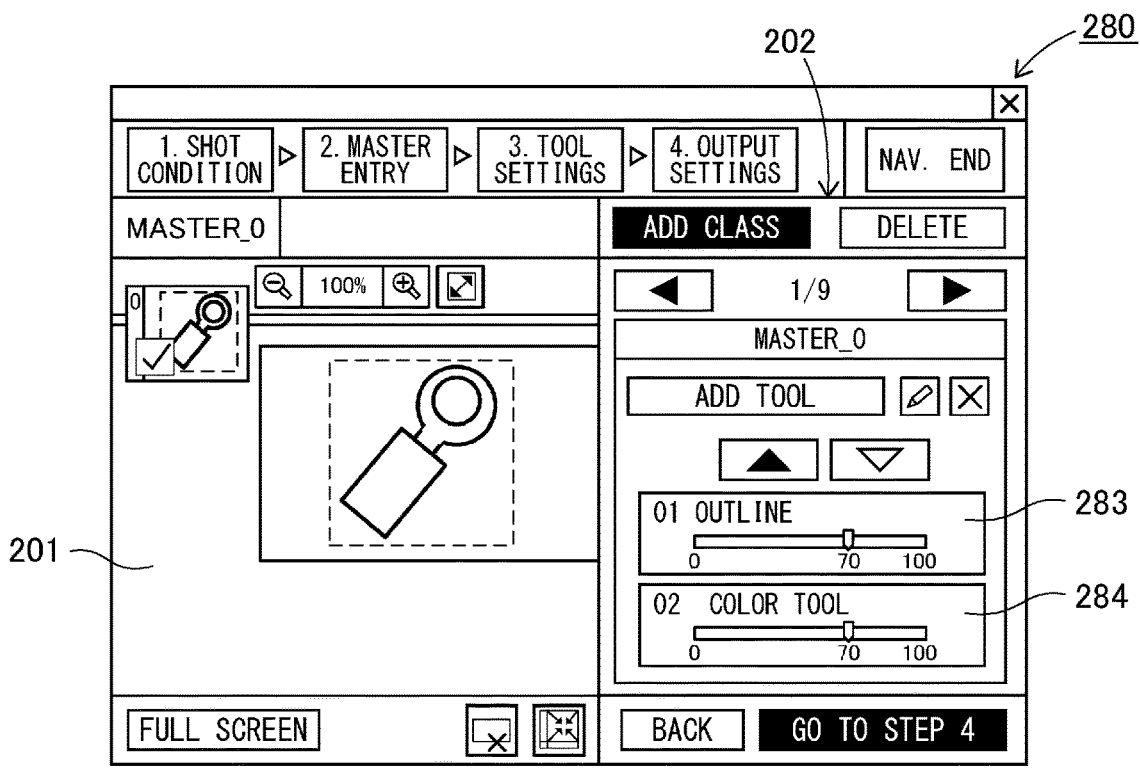
FIG. 25 is a schematic diagram showing a product class entry screen in which a color tool is additionally selected to be specified in addition to the screen shown in FIG. 24.

FIG. 25 is a schematic diagram showing an exemplary product class entry screen in which a color tool 284 is added. An inspection workpiece can be classified to classes based on concordance degree between a color that is detected in a detection window specified on a master image and a color that is detected in the same detection window on an input image of the inspection workpiece (classification workpiece image). The user can specify or set an arbitrary threshold relating to color concordance degree by using a slider of the color tool 284. In the case in which the color tool 284 is selected in addition to the outline tool 283, if both outline and color concordance degrees that are detected by the outline and color tools 283 and 284 are not lower than outline and color thresholds, respectively, an output that represents the first product class (MASTER_0) is provided, that is, outputs of outline and color concordance outputs are ANDed to provide the output representing the first product class.

Figure 26:
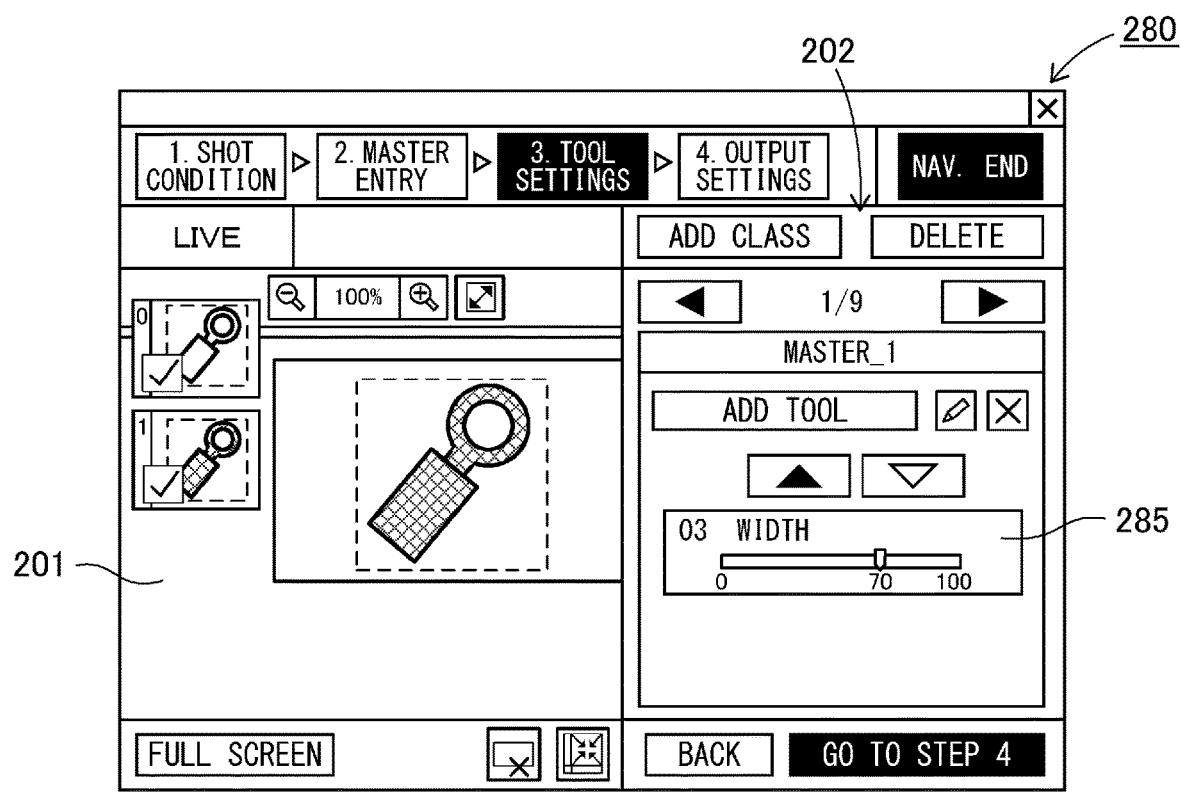
FIG. 26 is a schematic diagram showing a product class entry screen in which a width tool is selected to be specified.

FIG. 26 is a schematic diagram showing an exemplary product class entry screen in which a width tool 285 is selected to be applied to another product class image that is attached with the name "MASTER_1" (second product class image) to specify feature quantities of the second product class image. The user can specify concordance degree between a distance between two outlines or two of three or more outlines on the master image and a distance between two outlines or two of three or more outlines on an input image of an inspection workpiece (a classification workpiece image) by using the width tool 285. In this embodiment, a distance between two outlines or two of three or more outlines is referred to as a width. The user can specify or set an arbitrary threshold relating to width concordance degree, which represents concordance between a width between outlines on the master image and a width between outlines on an input image, by using a slider of the width tool 285. If a width concordance degree of the input image is not lower than the threshold, the inspection workpiece corresponding to the input image is determined as a second product class, which corresponds to second product class image attached with the name "MASTER_1", so that an output that represents the second product class (MASTER_1) is provided.

A plurality of different feature quantities that are used for classification can be specified by using the aforementioned classification tools on the product class entry screen 280 can be performed. After setting specification of rule base classification, when an inspection workpiece is classified to classes, detection windows corresponding to the classification tools are defined on an image of the inspection workpiece so that feature quantities corresponding to the classification tools are extracted from the detection windows. Users can adjust thresholds, which determine whether the inspection workpiece is determined as the master image in the setting specification, of concordance degree between feature quantities that are extracted from an inspection workpiece and the master image. When an input image is received in practical operation of the image inspection apparatus, detection windows to be defined in the input image are determined by using positional correction and the like, for example. Subsequently, feature quantities are extracted from the detection windows determined, and concordance degrees between the feature quantities extracted and the feature quantities that are extracted from the master image are calculated. The concordance degrees calculated are compared with their thresholds. As a result, the inspection workpiece can be determined whether it belongs to the same product class as the master image. Different tools can be applied to a master image or master images that belong to one product class as discussed above. In the case in which different tools are applied to a master image, an inspection workpiece can be determined in accordance with a combination of results of comparisons between feature quantities that extracted from an image of the inspection workpiece by the different tools and their thresholds whether the inspection workpiece belongs to the same product class as the master image.

An image inspection apparatus, an image inspection method, an image inspection program, and a computer-readable storage medium or storage device storing the image inspection program according to the present disclosure can be suitably used to capture an image of an inspection object, such as a workpiece, and to determine failure/no-failure of the inspection object and classify the inspection object to classes based on the image captured.

What is claimed is:
1. An image inspection apparatus comprising:
an illuminator that irradiates a workpiece as an inspection object with illumination light;
a camera that receives light that is reflected from the workpiece, which is irradiated by the illuminator, and produces a workpiece image;
a learned neural network storage storing one neural network or a plurality of neural networks including an input layer that receives the workpiece image, an intermediate layer that is connected to the input layer, and an output layer that is connected to the intermediate layer and provides feature quantities of the workpiece image received, the one neural network or plurality of neural networks previously learning weighting factors between the input, intermediate and output layers;

an inferer that determines failure/no-failure of the workpiece and classifies the workpiece to classes based on the workpiece image; and a tool specifier that specifies a master image and an inspection tool, the inferer being configured to:

specify a failure/no-failure determination boundary to be used to determine failure/no-failure of the workpiece in a feature quantity space(s) of the neural network(s) based on failure/no-failure feature quantities of failure and no-failure product workpiece images that represent failure and no-failure workpieces respectively and are captured by the camera, the failure/no-failure quantities being obtained by providing the failure and no-failure product workpiece images to the neural network(s), which is/are stored in the learned neural network storage, and determine failure/no-failure of an inspection workpiece based on failure/no-failure feature quantities of a workpiece image of the inspection workpiece that is captured by the camera and the failure/no-failure determination boundary, the failure/no-failure feature quantities of the inspection workpiece image being obtained by providing the inspection workpiece image to the neural network(s), which is/are stored in the learned neural network storage, in a first inference, specify a classification boundary to be used to classify an inspection workpiece to classes corresponding to different types of workpieces in a feature quantity space(s) of the neural network(s) based on a plurality of classification feature quantities of different types of workpiece images that are captured by the camera, the plurality of classification feature quantities being obtained by providing the different types of workpieces images to the neural network(s), which is/are stored in the learned neural network storage, and classify an inspection workpiece to classes based on classification feature quantities of a workpiece image of the inspection workpiece that is captured by the camera and the classification boundary, the classification feature quantities of the inspection workpiece image being obtained by providing the inspection workpiece image to the neural network(s), which is/are stored in the learned neural network storage, in a second inference, and execute the second inference independently from a result of the first inference, wherein the failure/no-failure feature quantities and the classification feature quantities are provided from a common neural network stored in the learned neural network storage, wherein a learning tool is specified as the inspection tool to be applied to the master image in the first inference, and a learning classification tool is specified as the inspection tool to be applied to the master image in the second inference, wherein the learning tool specifies an inspection area in the master image that represents failure or no-failure workpiece and specify the determination boundary, and wherein the learning classification tool specifies a classification-referential area in the master image to be seen in the classification and assigns the classification-referential area to the master image to be associated with one of the different types of workpiece images in an entry of the master image.

2. The image inspection apparatus according to claim 1, further comprising a mode selector that selects a failure/no-failure determination mode in which the first inference is performed, or a classification mode in which the second inference is performed.

3. The image inspection apparatus according to claim 1, further comprising a housing that accommodates the illuminator, the camera, the learned neural network storage, and the inferer, wherein the housing includes an interface that receives users' specification, wherein the interface allows users to select a failure/no-failure determination mode to determine failure/no-failure of a workpiece or a classification mode to classify a workpiece, and wherein the inferer performs the first or second inference in accordance with the mode that is selected through the interface.

4. The image inspection apparatus according to claim 1, wherein the inferer classifies a workpiece that is determined as no-failure in the first inference to multiple values by performing the second inference.

5. The image inspection apparatus according to claim 1, further comprising an output device including a plurality of output ports through which results that are obtained in the second inference by the inferer are provided, wherein the plurality of output ports are assigned to outputs of the different types of workpiece images to which an inspection workpiece is classified in the second inference.

6. The image inspection apparatus according to claim 1, further comprising a classification base selector that selects learning classification that is performed based on learning or standard classification that is performed based on a rule to be used as the second inference, which is performed by the inferer.

7. The image inspection apparatus according to claim 6, wherein a single tool is applied to an inspection workpiece in the learning classification, and wherein a plurality of tools that correspond to the different types of workpiece images are specified and are applied one after another to an inspection workpiece in the standard classification.

8. An image inspection method of inspecting a workpiece as an inspection object that is irradiated with illumination light by an illuminator by receiving light that is reflected from the workpiece to produce a workpiece image by using a camera to determine failure/no-failure of the workpiece or classify the workpiece to classes based on the workpiece image, the method comprising:

preparing one learned neural network or a plurality of learned neural networks including an input layer that receives the workpiece image, an intermediate layer that is connected to the input layer, and an output layer that is connected to the intermediate layer and provides feature quantities of the workpiece image, the one neural network or plurality of neural networks previously learning weighting factors between the input, intermediate and output layers;

storing the one neural network or plurality of neural networks in a learned neural network storage;

capturing an image of a no-failure workpiece to produce a no-failure product image by using the camera;

capturing an image of a failure workpiece to produce a failure product image by using the camera;

specifying a failure/no-failure determination boundary to be used to determine failure/no-failure of the workpiece in a feature quantity space(s) of the neural network(s) based on failure/no-failure feature quantities that are obtained by providing the failure and no-failure product workpiece images to the neural network(s), which is/are stored in the learned neural network storage, to obtain failure/no-failure feature quantities, which represent failure and no-failure workpieces, respectively, of the failure and no-failure product workpiece images;

capturing images of different types of workpieces to produce different-type classification workpiece images corresponding to different types of workpieces by using the camera;

specifying a classification boundary to be used to classify an inspection workpiece to classes corresponding to different types of workpieces in a feature quantity space(s) of the neural network(s) based on a plurality of classification feature quantities of the different-type classification workpiece images that are obtained by providing the different-type classification workpiece images to the neural network(s), which is/are stored in the learned neural network storage;

capturing an image of an inspection workpiece to produce an inspection workpiece image by using the camera;

obtaining failure/no-failure feature quantities of the inspection workpiece image by providing the inspection workpiece image to the neural network(s), which is/are stored in the learned neural network storage;

determining failure/no-failure of the inspection workpiece based on the failure/no-failure feature quantities obtained of the inspection workpiece image and the failure/no-failure determination boundary in a first inference;

obtaining classification feature quantities of the inspection workpiece image by providing the inspection workpiece image to the neural network(s), which is/are stored in the learned neural network storage;

classifying the inspection workpiece to the classes based on the classification feature quantities obtained of the inspection workpiece image and the classification boundary in a second inference;

executing the second inference independently from a result of the first inference; and specifying a master image and an inspection tool, wherein a learning tool is specified as the inspection tool to be applied to the master image in the first inference, the learning tool specifying an inspection area in the master image that represents failure or no-failure workpiece and specify the determination boundary, a learning classification tool is specified as the inspection tool to be applied to the master image in the second inference, the learning classification tool specifying a classification-referential area in the master image to be seen in the classification and assigns the classification-referential area to the master image to be associated with one of the different types of workpiece images in an entry of the master image, and the failure/no-failure feature quantities and the classification feature quantities are provided from a common neural network stored in the learned neural network storage.

\* \* \* \* \*